United States Patent
Zhang et al.

(10) Patent No.: US 11,483,495 B2
(45) Date of Patent: *Oct. 25, 2022

(54) METHOD, APPARATUS, AND SYSTEM FOR IMPLEMENTING VIDEO STREAM SWITCHING

(71) Applicant: HUAWEI TECHNOLOGIES CO., LTD., Guangdong (CN)

(72) Inventors: Jinhui Zhang, Nanjing (CN); Jie Xiong, Nanjing (CN); Ji Li, Nanjing (CN); Wenbin Liu, Nanjing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/180,568

(22) Filed: Feb. 19, 2021

(65) Prior Publication Data

US 2021/0176408 A1 Jun. 10, 2021

Related U.S. Application Data

(63) Continuation of application No. PCT/CN2019/101241, filed on Aug. 18, 2019.

(30) Foreign Application Priority Data

Aug. 22, 2018 (CN) .......................... 201810962907.4

(51) Int. Cl.
*H04N 5/268* (2006.01)
*H04N 5/38* (2006.01)

(52) U.S. Cl.
CPC ............... *H04N 5/268* (2013.01); *H04N 5/38* (2013.01)

(58) Field of Classification Search
CPC .... H04N 5/268; H04N 5/38; H04N 21/21805; H04N 21/2187; H04N 21/64322;
(Continued)

(56) References Cited

U.S. PATENT DOCUMENTS 11,212,563 B2 * 12/2021 Xiong .................. H04N 21/242
2008/0021971 A1   1/2008 Halgas
(Continued)

FOREIGN PATENT DOCUMENTS

CN          1694529 A      11/2005
CN        101047848 A      10/2007
(Continued)

OTHER PUBLICATIONS

Wang Ying et al.,"Video Switch Scheme in SDI over IP Live Production System",Radio and TV Broadcast Engineering,2018,vol. 45(5),with an English abstract, total 4 pages.
(Continued)

*Primary Examiner* — Paulos M Natnael
(74) *Attorney, Agent, or Firm* — Leydig, Voit & Mayer, Ltd.

(57) ABSTRACT

Disclosed are a method, an apparatus, and a system for implementing video stream switching. The method can determine switching reference information of a first reference frame trailer packet of a first video stream and switching reference information of a second reference frame trailer packet of a second video stream, when receiving a switching instruction; and switch from the first video stream sent through the target egress port to the second video stream based on the switching reference information of the first switching packet and the switching reference information of the second switching packet. Because locations of data packets sent before and after switching are considered during video stream switching, damage caused by a switch-
(Continued)

ing operation to a transmitted video image can be effectively reduced.

20 Claims, 9 Drawing Sheets

(58) Field of Classification Search
CPC ......... H04N 21/23424; H04N 21/8547; H04N 21/4402; H04N 21/440218; H04N 21/44016; H04N 21/236; H04N 21/643
See application file for complete search history.

(56) References Cited

U.S. PATENT DOCUMENTS

| | | | |
|---|---|---|---|
| 2008/0205507 A1* | 8/2008 | Komiya | H04N 21/44004 709/201 |
| 2009/0097496 A1* | 4/2009 | Nakamura | H04N 21/236 370/419 |
| 2011/0164178 A1* | 7/2011 | Hardy | H04N 21/8547 348/E5.011 |
| 2012/0098923 A1 | 4/2012 | Westin | |
| 2013/0301830 A1 | 11/2013 | Bar-El et al. | |
| 2014/0375889 A1* | 12/2014 | Cho | H04N 5/268 348/706 |
| 2016/0373495 A1 | 12/2016 | Chen et al. | |
| 2017/0070452 A1 | 3/2017 | Rayner | |
| 2017/0359611 A1 | 12/2017 | Iguchi et al. | |
| 2018/0176630 A1* | 6/2018 | Auld | H04N 21/6125 |
| 2018/0310049 A1* | 10/2018 | Takahashi | H04N 21/439 |
| 2021/0204007 A1* | 7/2021 | Xiong | H04N 21/23602 |
| 2021/0377458 A1* | 12/2021 | Xiong | H04N 21/23424 |

FOREIGN PATENT DOCUMENTS

| | | |
|---|---|---|
| CN | 101316357 A | 12/2008 |
| CN | 101753973 A | 6/2010 |
| CN | 101854533 A | 10/2010 |
| CN | 101917390 A | 12/2010 |
| CN | 102045586 A | 5/2011 |
| CN | 102341859 A | 2/2012 |
| CN | 102833584 A | 12/2012 |
| CN | 103907358 A | 7/2014 |
| CN | 105554532 A | 5/2016 |
| CN | 106162235 A | 11/2016 |
| CN | 106937155 A | 7/2017 |
| CN | 107018379 A | 8/2017 |
| CN | 107086963 A | 8/2017 |
| CN | 107135169 A | 9/2017 |
| CN | 107770538 A | 3/2018 |
| CN | 107888909 A | 4/2018 |
| EP | 2369840 A1 | 9/2011 |
| EP | 3185564 A1 | 6/2017 |
| EP | 2724491 B1 | 11/2017 |
| WO | 2010017656 A1 | 2/2010 |

OTHER PUBLICATIONS

Request for Comments: 3550, H. Schulzrinne et al, RTP: A Transport Protocol for Real-Time Applications, Network Working Group, Jul. 2003, total 89 pages.

Schulzrinne et al., "RTP: A Transport Protocol for Real-Time Applications," Request for Comments: 3550, total 89 pages (Jul. 2003).

"SMPTE Recommended Practice, Definition of Vertical Interval Switching Point for Synchronous Video Switching," RP 168-2009, total 23 pages (2009).

"SMPTE Standard, Transport of High Bit Rate Media Signals over IP Networks (HBRMT)," SMPTE ST 2022-6:2012, total 16 pages (2012).

"SMPTE Standard, Professional Media Over Managed IP Networks: System Timing and Definitions," SMPTE ST 2110-10:2017, total 17 pages (2017).

"SMPTE Standard, Professional Media Over Managed IP Networks: Uncompressed Active Video," SMPTE ST 2110-20:2017, total 22 pages (2017).

"SMPTE Standard, Professional Media Over Managed IP Networks: Traffic Shaping and Delivery Timing for Video," SMPTE ST 2110-21:2017, total 17 pages (2017).

"SMPTE Standard, Professional Media Over Managed IP Networks: PCM Digital Audio," SMPTE ST 2110-30:2017, total 9 pages (2017).

"SMPTE Standard, Professional Media Over Managed IP Networks: SMPTE ST 291-1 Ancillary Data," SMPTE ST 2110-40:2018, total 8 pages (2018).

* cited by examiner

METHOD, APPARATUS, AND SYSTEM FOR IMPLEMENTING VIDEO STREAM SWITCHING

CROSS-REFERENCE TO RELATED APPLICATIONS

This application is a continuation of International Application No. PCT/CN2019/101241, filed on Aug. 18, 2019, which claims priority to Chinese Patent Application No. 201810962907.4, filed on Aug. 22, 2018. The disclosures of the aforementioned applications are hereby incorporated by reference in their entireties.

TECHNICAL FIELD

Embodiments of the present invention relate to the field of multimedia communications technologies, and in particular, to a method, an apparatus, and a system for implementing video stream switching.

BACKGROUND

In the field of multimedia communications technologies, for example, in the field of television (TV) production and broadcasting, it may be desirable to switch between video streams sent by different video source devices. For example, during a live broadcast of a football match, received video streams taken by equipment in different locations of a stadium may be switched on a transmission device (for example, a router), so that video images of the stadium at different angles are switched for display on a video terminal.

In the field of conventional TV production and broadcasting, a video stream is usually transmitted in a serial digital interface (SDI) format. A maximum length of a coaxial cable used to transmit an SDI signal is usually limited, and the coaxial cable is relatively expensive. Therefore, in the field of TV production and broadcasting, a video stream may be transmitted by using an internet protocol (IP) network. For example, the SDI signal is transmitted by using an IP packet.

In the prior art for switching a video stream transmitted by using an IP network, when determining that a video stream needs to be switched, a transmission device stops sending a data packet of a to-be-switched-out video stream, and starts to send a data packet of a to-be-switched-in video stream.

Video stream switching in the prior art usually causes damage to a video image.

SUMMARY

Embodiments of the present invention provide a method, an apparatus, and a system for implementing video stream switching to avoid causing damage to a video image during the switching.

According to a first aspect, a method for implementing video stream switching is provided. The method includes: receiving, by a transmission device, a first video stream and a second video stream; sending the first video stream through a target egress port; after receiving a switching instruction used to instruct to switch from the first video stream sent through the target egress port to the second video stream, determining switching reference information (for example, a sequence number) of a first reference frame trailer packet of the first video stream and switching reference information of a second reference frame trailer packet of the second video stream according to the switching instruction; determining switching reference information of a first switching packet of the first video stream based on the switching reference information of the first reference frame trailer packet, and determining switching reference information of a second switching packet of the second video stream based on the switching reference information of the second reference frame trailer packet; and switching from the first video stream sent through the target egress port to the second video stream based on the switching reference information of the first switching packet and the switching reference information of the second switching packet. The switching reference information of the first reference frame trailer packet, the switching reference information of the second reference frame trailer packet, the switching reference information of the first switching packet, and the switching reference information of the second switching packet each may be a sequence number or a timestamp, or each may include a sequence number and a timestamp.

In the implementation of the first aspect, switching reference information (for example, a sequence number) of a switching packet of a switch-out stream (that is, the first video stream) and switching reference information of a switch-in stream (that is, the second video stream) are determined based on switching reference information of a frame trailer packet of the switch-out stream and switching reference information of a frame trailer packet of the switch-in stream, and video stream switching is performed based on the switching reference information of the switching packet of the switch-out stream and the switching reference information of the switching packet of the switch-in stream. Because locations of data packets sent before and after switching are considered during video stream switching, damage caused by a switching operation to a transmitted video image can be effectively reduced.

In a first implementation of the first aspect, the first reference frame trailer packet and the second reference frame trailer packet may be respectively the last but (x−1) frame trailer packet of the first video stream and the last but (x−1) frame trailer packet of the second video stream that are received before the switching reference information of the first reference frame trailer packet and the switching reference information of the second reference frame trailer packet are determined, where x is a natural number, and may be 1.

The timestamp of the first reference frame trailer packet and the timestamp of the second reference frame trailer packet that are determined in this implementation are relatively close. Therefore, the first switching packet and the second switching packet whose timestamps are relatively consistent can be more accurately determined, so as to further reduce damage caused by a switching operation to a transmitted video image.

Based on the first implementation of the first aspect, in a second implementation of the first aspect, a value of x is 1; and a video frame to which video data in the first switching packet belongs is a next video frame of a video frame to which video data in the first reference frame trailer packet belongs or a subsequent video frame of the next video frame, and a video frame to which video data in the second switching packet belongs is a next video frame of a video frame to which video data in the second reference frame trailer packet belongs or a subsequent video frame of the next video frame. The sequence number of the first switching packet may be calculated based on the sequence number of the first reference frame trailer packet and a quantity of packets for encapsulating a single video frame of the first video stream, and the sequence number of the second switching packet may be calculated based on the sequence number of the second reference frame trailer packet and a quantity of packets for encapsulating a single video frame of the second video stream. A difference between the determined sequence number of the first switching packet and the sequence number of the first reference frame trailer packet may be greater than or equal to the quantity of packets for encapsulating a single video frame of the first video stream, and a difference between the determined sequence number of the second switching packet and the sequence number of the second reference frame trailer packet may be greater than or equal to the quantity of packets for encapsulating a single video frame of the second video stream. The timestamp of the first switching packet may be further calculated based on the timestamp of the first reference frame trailer packet and duration of a single video frame of the first video stream, and the timestamp of the second switching packet may be further calculated based on the timestamp of the second reference frame trailer packet and duration of a single video frame of the second video stream. A difference between the determined timestamp of the first switching packet and the timestamp of the first reference frame trailer packet may be greater than or equal to the duration of the single video frame of the first video stream, and a difference between the determined timestamp of the second switching packet and the timestamp of the second reference frame trailer packet may be greater than or equal to the duration of the single video frame of the second video stream.

In this implementation, video stream switching is performed at a location of at least one frame after a reference frame trailer packet, so as to effectively avoid damage to a currently transmitted video image.

Based on the first aspect or the first or the second implementation of the first aspect, in a third implementation of the first aspect, the switching reference information of the first switching packet may be determined based on the switching reference information of the first reference frame trailer packet and a synchronization relationship between the first video stream and the second video stream, and the switching reference information of the second switching packet may be determined based on the switching reference information of the second reference frame trailer packet and the synchronization relationship.

In this implementation, the synchronization relationship between the video streams is considered when the switching reference information of the first switching packet and the switching reference information of the second switching packet are calculated. Therefore, video stream switching can be performed more accurately, so as to further reduce damage caused by a switching operation to a transmitted video image.

Based on the third implementation of the first aspect, in a fourth implementation of the first aspect, switching reference information of a first alignment frame trailer packet of the first video stream may be determined based on the switching reference information of the first reference frame trailer packet and the synchronization relationship, and the switching reference information of the first switching packet may be determined based on the switching reference information of the first alignment frame trailer packet; and switching reference information of a second alignment frame trailer packet of the second video stream may be further determined based on the switching reference information of the second reference frame trailer packet and the synchronization relationship, and the switching reference information of the second switching packet may be further determined based on the switching reference information of the second alignment frame trailer packet. The first alignment frame trailer packet and the second alignment frame trailer packet are temporally corresponding frame trailer packets.

In this implementation, the first alignment frame trailer packet and the second alignment frame trailer packet that are determined when the synchronization relationship is considered are temporally corresponding frame trailer packets. Therefore, the first switching packet and the second switching packet that are respectively determined based on the first alignment frame trailer packet and the second alignment frame trailer packet are also temporally corresponding, so as to further reduce damage caused by a switching operation to a transmitted video image.

Based on the fourth implementation of the first aspect, in a fifth implementation of the first aspect, the switching reference information of the first alignment frame trailer packet may be directly used as the switching reference information of the first switching packet, and the switching reference information of the second alignment frame trailer packet may be directly used as the switching reference information of the second switching packet. In other words, the first alignment frame trailer packet is directly used as the first switching packet, and the second alignment frame trailer packet is directly used as the second switching packet.

In this implementation, video stream switching may be performed at a boundary of a video frame, so as to effectively avoid damage caused by a switching operation to a transmitted video image.

Based on the fourth implementation of the first aspect, in a sixth implementation of the first aspect, switching reference information of a data packet used to encapsulate blanking area data of a next video frame of a video frame to which video data in the first alignment frame trailer packet belongs may be determined as the switching reference information of the first switching packet, and switching reference information of a data packet used to encapsulate blanking area data of a next video frame of a video frame to which video data in the second alignment frame trailer packet belongs may be determined as the switching reference information of the second switching packet.

In this implementation, video stream switching may be performed at a data packet for encapsulating a blanking area of a video frame. Because the blanking area data is not valid video data and is invisible to human eyes, damage to valid video data can be avoided.

That switching reference information includes a sequence number is used as an example. During specific implementation, when it is determined that the synchronization relationship is that the first video stream is earlier than the second video stream, a sum of the sequence number of the first reference frame trailer packet and m×M1 may be determined as the sequence number of the first alignment frame trailer packet, and a sum of the sequence number of the second reference frame trailer packet and (m+1)×M2 may be determined as the sequence number of the second alignment frame trailer packet. Alternatively, when it is determined that the synchronization relationship is that the first video stream is later than the second video stream, a sum of the sequence number of the first reference frame trailer packet and (n+1)×M1 is determined as the sequence number of the first alignment frame trailer packet, and a sum of the sequence number of the second reference frame trailer packet and n×M2 is determined as the sequence number of the second alignment frame trailer packet. Alternatively, when it is determined that the synchronization relationship is that the first video stream is synchronized with the second video stream, a sum of the sequence number of the first reference frame trailer packet and k×M1 may be determined as the sequence number of the first alignment frame trailer packet, and a sum of the sequence number of the second reference frame trailer packet and k×M2 may be determined as the sequence number of the second alignment frame trailer packet. Herein, M1 is a quantity of data packets required for encapsulating a video frame of the first video stream, M2 is a quantity of data packets required for encapsulating a video frame of the second video stream, and m, n, and k are all natural numbers.

Based on any one of the third to the sixth implementations of the first aspect, in a seventh implementation of the first aspect, the transmission device may determine the synchronization relationship between the first video stream and the second video stream based on the timestamp of the first reference frame trailer packet and the timestamp of the second reference frame trailer packet.

In this implementation, because the synchronization relationship is determined based on the first reference frame trailer packet and the second reference frame trailer packet, the synchronization relationship may reflect a synchronization status when the transmission device receives the first reference frame trailer packet and the second reference frame trailer packet. Therefore, the switching reference information of the first switching packet and the switching reference information of the second switching packet that are determined based on a combination of the switching reference information of the first reference frame trailer packet, the switching reference information of the second reference frame trailer packet, and the synchronization relationship are more compliant with an actual status of synchronization between video streams, so as to further reduce damage caused by a switching operation to a transmitted video image.

Because of a precision deviation of device synchronization, there may be a deviation between timestamps of data packets sent by different video source devices at a same moment. In addition, information is transmitted in one packet in an IP network, and a jitter of packet forwarding may cause some synchronization deviations. Therefore, it may be considered that two video streams are synchronized if a deviation between timestamps of reference frame trailer packets of the two video streams is less than a preset time difference threshold.

Correspondingly, when determining that t1−t2>Δt1, the transmission device may determine that the first video stream is earlier than the second video stream. Alternatively, when determining that t2−t1>Δt1, the transmission device may determine that the first video stream is later than the second video stream. Alternatively, when determining that |t1−t2|<Δt2, the transmission device may determine that the first video stream is synchronized with the second video stream. Herein, t1 is the timestamp of the first reference frame trailer packet, t2 is the timestamp of the second reference frame trailer packet, Δt1 is a preset first time difference threshold, Δt2 is a preset second time difference threshold, both Δt1 and Δt2 are values greater than 0 and less than T, and Δt2 may be less than or equal to Δt1. In addition, Δt1 and Δt2 may be preset as follows: T/2<Δt1<T. For example, Δt1 may be 3×T/4, and 0<Δt2<T/2. For example, Δt2 may be T/4, and T is duration of a single video frame.

In this implementation, the determined synchronization relationship excludes impact of a precision deviation of device synchronization, a jitter of packet forwarding, and the like, and can better reflect an actual status of synchronization between video streams, and the determined switching reference information of the first switching packet and the determined switching reference information of the second switching packet are also more compliant with the actual status of synchronization between video streams, so as to further reduce damage caused by a switching operation to a transmitted video image.

According to a second aspect, a transmission device is provided. The transmission device includes a processing unit and a communications unit.

The communications unit is configured to: receive a first video stream and a second video stream; send the first video stream through a target egress port of the transmission device; and receive a switching instruction, where the switching instruction is used to instruct to switch from the first video stream sent through the target egress port to the second video stream. The processing unit is configured to: determine switching reference information (for example, a sequence number) of a first reference frame trailer packet of the first video stream and switching reference information of a second reference frame trailer packet of the second video stream according to the switching instruction; and determine switching reference information of a first switching packet of the first video stream based on the switching reference information of the first reference frame trailer packet, and determine switching reference information of a second switching packet of the second video stream based on the switching reference information of the second reference frame trailer packet. The communications unit is further configured to switch from the first video stream sent through the target egress port to the second video stream based on the switching reference information of the first switching packet and the switching reference information of the second switching packet. The switching reference information of the first reference frame trailer packet, the switching reference information of the second reference frame trailer packet, the switching reference information of the first switching packet, and the switching reference information of the second switching packet each may be a sequence number or a timestamp, or each may include a sequence number and a timestamp.

In the implementation of the second aspect, switching reference information (for example, a sequence number) of a switching packet of a switch-out stream (that is, the first video stream) and switching reference information of a switch-in stream (that is, the second video stream) are determined based on switching reference information of a frame trailer packet of the switch-out stream and switching reference information of a frame trailer packet of the switch-in stream, and video stream switching is performed based on the switching reference information of the switching packet of the switch-out stream and the switching reference information of the switching packet of the switch-in stream. Because locations of data packets sent before and after switching are considered during video stream switching, damage caused by a switching operation to a transmitted video image can be effectively reduced.

In a first implementation of the second aspect, the first reference frame trailer packet and the second reference frame trailer packet may be respectively the last but (x−1) frame trailer packet of the first video stream and the last but (x−1) frame trailer packet of the second video stream that are received before the switching reference information of the first reference frame trailer packet and the switching reference information of the second reference frame trailer packet are determined, where x is a natural number, and may be 1.

The timestamp of the first reference frame trailer packet and the timestamp of the second reference frame trailer packet that are determined in this implementation are relatively close. Therefore, the first switching packet and the second switching packet whose timestamps are relatively consistent can be more accurately determined, so as to further reduce damage caused by a switching operation to a transmitted video image.

Based on the first implementation of the second aspect, in a second implementation of the second aspect, a value of x is 1; and a video frame to which video data in the first switching packet belongs is a next video frame of a video frame to which video data in the first reference frame trailer packet belongs or a subsequent video frame of the next video frame, and a video frame to which video data in the second switching packet belongs is a next video frame of a video frame to which video data in the second reference frame trailer packet belongs or a subsequent video frame of the next video frame.

In this implementation, video stream switching is performed at a location of at least one frame after a reference frame trailer packet, so as to effectively avoid damage to a currently transmitted video image.

Based on the second aspect or the first or the second implementation of the second aspect, in a third implementation of the second aspect, the processing unit may determine the switching reference information of the first switching packet based on the switching reference information of the first reference frame trailer packet and a synchronization relationship between the first video stream and the second video stream, and determine the switching reference information of the second switching packet based on the switching reference information of the second reference frame trailer packet and the synchronization relationship.

In this implementation, the synchronization relationship between the video streams is considered when the switching reference information of the first switching packet and the switching reference information of the second switching packet are calculated. Therefore, video stream switching can be performed more accurately, so as to further reduce damage caused by a switching operation to a transmitted video image.

Based on the third implementation of the second aspect, in a fourth implementation of the second aspect, the processing unit may determine switching reference information of a first alignment frame trailer packet of the first video stream based on the switching reference information of the first reference frame trailer packet and the synchronization relationship, and determine the switching reference information of the first switching packet based on the switching reference information of the first alignment frame trailer packet; and the processing unit may further determine switching reference information of a second alignment frame trailer packet of the second video stream based on the switching reference information of the second reference frame trailer packet and the synchronization relationship, and determine the switching reference information of the second switching packet based on the switching reference information of the second alignment frame trailer packet. The first alignment frame trailer packet and the second alignment frame trailer packet are temporally corresponding frame trailer packets.

In this implementation, the first alignment frame trailer packet and the second alignment frame trailer packet that are determined when the synchronization relationship is considered are temporally corresponding frame trailer packets. Therefore, the first switching packet and the second switching packet that are respectively determined based on the first alignment frame trailer packet and the second alignment frame trailer packet are also temporally corresponding, so as to further reduce damage caused by a switching operation to a transmitted video image.

Based on the fourth implementation of the second aspect, in a fifth implementation of the second aspect, the processing unit may directly use the switching reference information of the first alignment frame trailer packet as the switching reference information of the first switching packet, and use the switching reference information of the second alignment frame trailer packet as the switching reference information of the second switching packet. In other words, the processing unit directly uses the first alignment frame trailer packet as the first switching packet, and uses the second alignment frame trailer packet as the second switching packet.

In this implementation, video stream switching may be performed at a boundary of a video frame, so as to effectively avoid damage caused by a switching operation to a transmitted video image.

Based on the fourth implementation of the second aspect, in a sixth implementation of the second aspect, the processing unit may determine, as the switching reference information of the first switching packet, switching reference information of a data packet used to encapsulate blanking area data of a next video frame of a video frame to which video data in the first alignment frame trailer packet belongs, and determine, as the switching reference information of the second switching packet, switching reference information of a data packet used to encapsulate blanking area data of a next video frame of a video frame to which video data in the second alignment frame trailer packet belongs.

In this implementation, video stream switching may be performed at a data packet for encapsulating a blanking area of a video frame. Because the blanking area data is not valid video data and is invisible to human eyes, damage to valid video data can be avoided.

Based on any one of the third to the sixth implementations of the second aspect, in a seventh implementation of the second aspect, the transmission device may determine the synchronization relationship between the first video stream and the second video stream based on the timestamp of the first reference frame trailer packet and the timestamp of the second reference frame trailer packet.

In this implementation, because the synchronization relationship is determined based on the first reference frame trailer packet and the second reference frame trailer packet, the synchronization relationship may reflect a synchronization status when the transmission device receives the first reference frame trailer packet and the second reference frame trailer packet. Therefore, the switching reference information of the first switching packet and the switching reference information of the second switching packet that are determined based on a combination of the switching reference information of the first reference frame trailer packet, the switching reference information of the second reference frame trailer packet, and the synchronization relationship are more compliant with an actual status of synchronization between video streams, so as to further reduce damage caused by a switching operation to a transmitted video image.

Because of a precision deviation of device synchronization, there may be a deviation between timestamps of data packets sent by different video source devices at a same moment. In addition, information is transmitted in one packet in an IP network, and a jitter of packet forwarding may cause some synchronization deviations. Therefore, it may be considered that two video streams are synchronized if a deviation between timestamps of reference frame trailer packets of the two video streams is less than a preset time difference threshold.

Correspondingly, when determining that t1−t2>Δt1, the processing unit may determine that the first video stream is earlier than the second video stream. Alternatively, when determining that t2−t1>Δt1, the processing unit may determine that the first video stream is later than the second video stream. Alternatively, when determining that |t1−t2|<Δt2, the processing unit may determine that the first video stream is synchronized with the second video stream. Herein, t1 is the timestamp of the first reference frame trailer packet, t2 is the timestamp of the second reference frame trailer packet, Δt1 is a preset first time difference threshold, Δt2 is a preset second time difference threshold, both Δt1 and Δt2 are values greater than 0 and less than T, and Δt2 may be less than or equal to Δt1. In addition, Δt1 and Δt2 may be preset as follows: T/2<Δt1<T. For example, Δt1 may be 3×T/4, and 0<Δt2<T/2. For example, Δt2 may be T/4, and T is duration of a single video frame.

In this implementation, the determined synchronization relationship excludes impact of a precision deviation of device synchronization, a jitter of packet forwarding, and the like, and can better reflect an actual status of synchronization between video streams, and the determined switching reference information of the first switching packet and the determined switching reference information of the second switching packet are also more compliant with the actual status of synchronization between video streams, so as to further reduce damage caused by a switching operation to a transmitted video image.

According to a third aspect, a system for implementing video stream switching is provided. The system includes a controller and the transmission device in the second aspect or any implementation of the second aspect. The controller is configured to send a switching instruction to the transmission device.

According to a fourth aspect, a computer readable storage medium is provided. The computer-readable storage medium stores an instruction, and when the instruction is run on a computer, the computer is enabled to perform the method in the first aspect or any implementation of the first aspect.

According to a fifth aspect, a computer program product including an instruction is provided. When the computer program product is run on a computer, the computer is enabled to perform the method in the first aspect or any implementation of the first aspect.

BRIEF DESCRIPTION OF DRAWINGS

To describe the technical solutions in the embodiments of the present invention more clearly, the following briefly describes the accompanying drawings required for the embodiments.

DESCRIPTION OF EMBODIMENTS

The following describes the embodiments of the present invention with reference to accompanying drawings.

Figure 1:
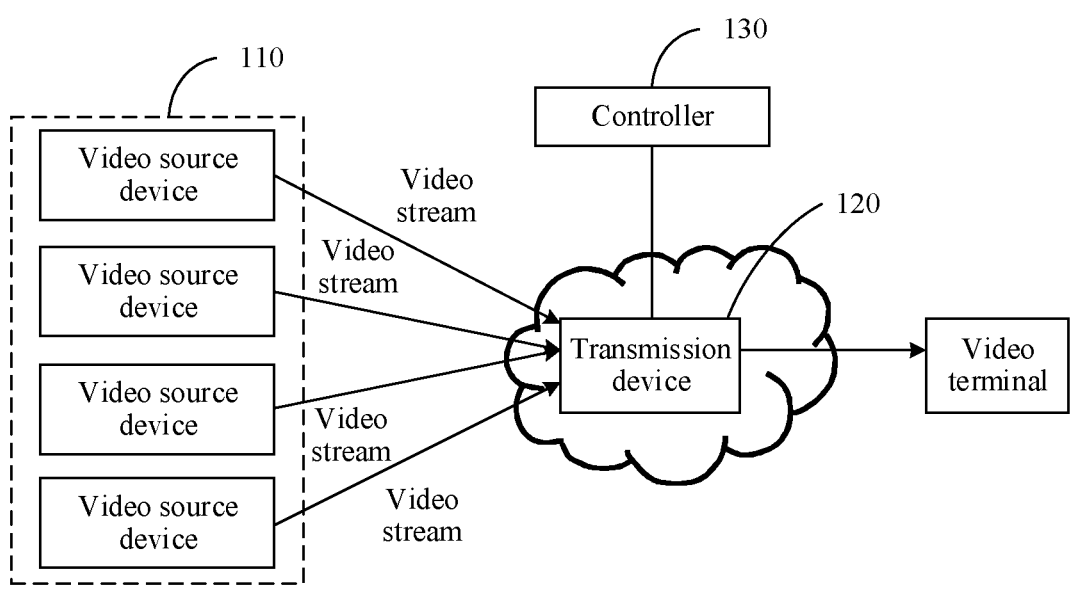
FIG. 1 is a schematic structural diagram of networking of a multimedia communications system 100 according to an embodiment of the present invention.

FIG. 1 is a schematic diagram of a multimedia communications system 100 according to an embodiment of the present invention. The multimedia communications system 100 includes one or more video source devices 110 and a transmission device 120. Each video source device 110 sends a video stream to a video terminal through the transmission device 120. The transmission device 120 may receive video streams from a plurality of video source devices 110 and forward only one of the video streams to the video terminal, and may further switch the forwarded video stream received from one video source device 110 to another. The transmission device 120 may be a switch, a router, or the like. Each video source device 110 may be an IP camera, a device that performs IP encapsulation and transmission on video data, or the like. The multimedia communications system 100 may be a TV production and broadcasting system, for example, a system that has a net switching requirement on a video stream carried on an IP network, for example, a master control system, a studio system, or a broadcasting system of a TV station production and broadcasting network.

As shown in FIG. 1, the multimedia communications system 100 may further include a controller (Controller) 130. The controller 130 is configured to send, to the transmission device 120, a switching instruction used to instruct the transmission device 120 to perform video stream switching. Correspondingly, the transmission device 120 performs video stream switching after receiving the switching instruction.

In this embodiment of the present invention, each video frame of a video is encapsulated into a plurality of data packets for transmission. Subsequently, the last data packet in the plurality of data packets into which each video frame is encapsulated is referred to as a frame trailer packet. A data packet in this embodiment of the present invention carries a sequence number and/or a timestamp, and information used to determine whether the data packet is a frame trailer packet, and may be a real-time transport protocol (Real-time Transport Protocol, RTP) packet, a proprietary protocol-based packet, or the like. In the standard Society of Motion Picture and Television Engineers (The Society of Motion Picture and Television Engineers, SMPTE) 2022 and the standard SMPTE 2110, an RTP is used to carry audio and video data of a production and broadcasting network. For example, in the standard SMPTE 2022-6 (Transport of High Bit Rate Media Signals over IP Networks (HBRMT)), video data in an SDI format is encapsulated by using the RTP, and is transmitted over an IP-based network.

A video frame in this embodiment of the present invention is an uncompressed video frame, and may be a YUV video frame or an RGB video frame. A quantity of packets of a single video frame of one video stream (that is, a quantity of data packets required for encapsulating one video frame of the video stream) usually remains unchanged, and may be preset, or may be calculated based on a difference between sequence numbers of two adjacent frame trailer packets of the received video stream, where there may be usually thousands of packets. Duration of a single video frame of one video stream usually remains unchanged, and may be preset, or may be calculated based on a difference between timestamps of two adjacent frame trailer packets of the received video stream.

A switching packet in this embodiment of the present invention is a data packet at a switching location. Switching reference information of the switching packet is information that is in the switching packet and that is used for video stream switching, and may include at least one of a sequence number of the switching packet (which may be subsequently referred to as a switching sequence number for short) and a timestamp of the switching packet (which may be subsequently referred to as a switching timestamp for short). During video stream switching, switching is performed based on switching reference information of a switching packet of a to-be-switched-out video stream (subsequently referred to as a switch-out stream for short) and switching reference information of a switching packet of a to-be-switched-in video stream (subsequently referred to as a switch-in stream for short). For example, for the switch-out stream, a data packet whose sequence number is greater than a switching sequence number of the switch-out stream is not forwarded. For the switch-in stream, a data packet whose sequence number is greater than a switching sequence number of the switch-in stream starts to be forwarded.

Figure 2:
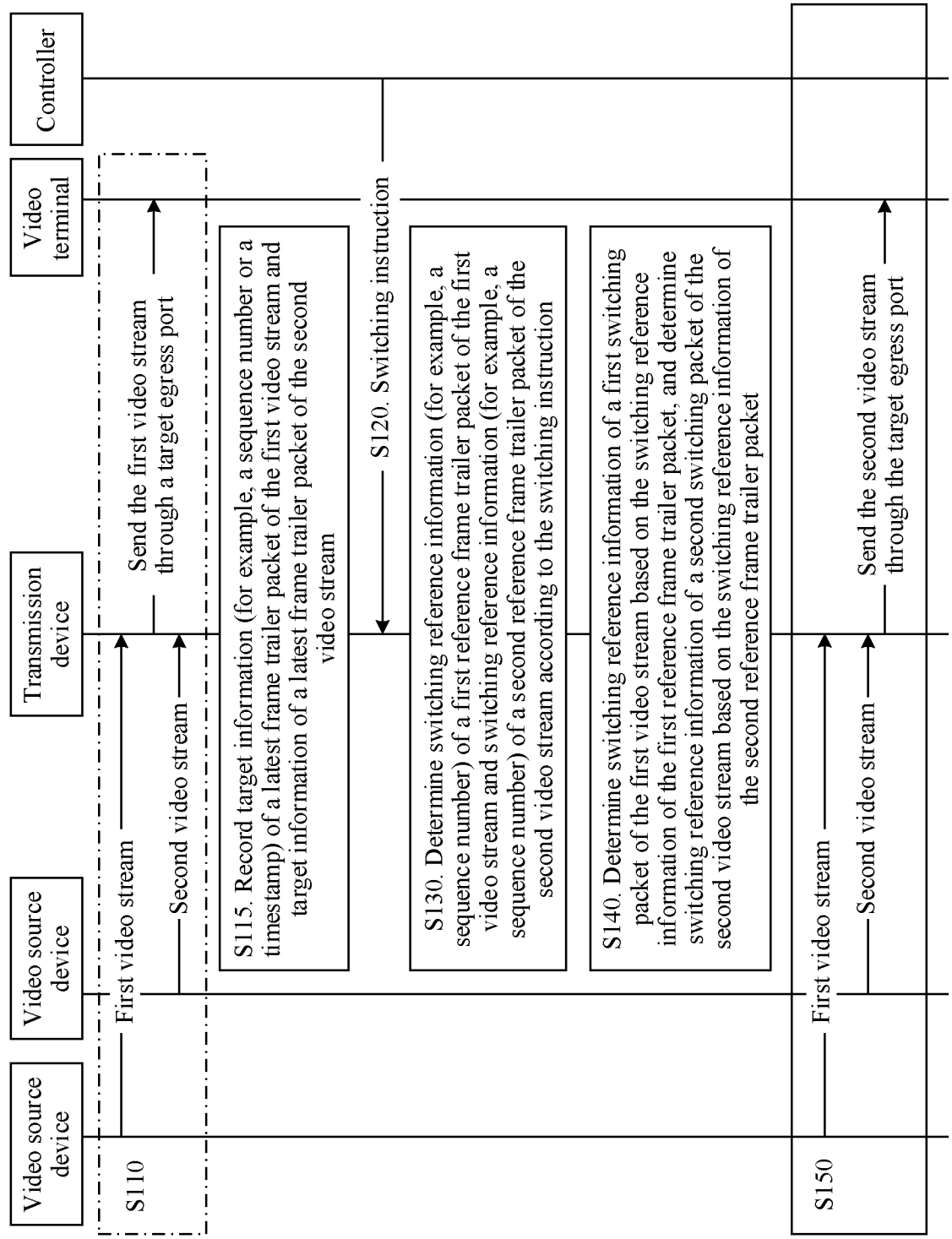
FIG. 2 is a schematic flowchart of a method 100 according to an embodiment of the present invention.

The following describes the method 100 provided in Embodiment 1 of the present invention with reference to FIG. 2, FIG. 3A to FIG. 3C, and FIG. 4A to FIG. 4C. FIG. 2 is a schematic flowchart of a method according to Embodiment 1 of the present invention. The method in Embodiment 1 of the present invention may be applied to the multimedia communications system 100 shown in FIG. 1, and is performed by a transmission device.

FIG. 2 is a signal sequence diagram according to a method of one embodiment. As shown in FIG. 2, the method 100 includes the following steps.

S110. The transmission device (the transmission device 120 shown in FIG. 1) receives a first video stream and a second video stream, and sends the first video stream through a target egress port of the transmission device.

The transmission device forwards a data packet of the received first video stream through the target egress port, but does not forward a data packet of the received second video stream through the target egress port.

The transmission device may receive a plurality of video streams corresponding to the target egress port, send one of the plurality of video streams through the target egress port, and switch, in the plurality of video streams, the video stream sent through the target egress port. The first video stream is a video stream that is currently sent through the target egress port when step S110 is performed, and the second video stream is a video stream in the plurality of video streams other than the first video stream.

S120. The transmission device receives a switching instruction used to instruct to switch from the first video stream sent through the target egress port to the second video stream.

The switching instruction may be received from a controller (the controller 130 shown in FIG. 1).

The switching instruction may include a port number of the target egress port, an identifier of the first video stream (for example, a multicast address of the first video stream), and an identifier of the second video stream (for example, a multicast address of the second video stream), to instruct the transmission device to switch from the first video stream sent through the target egress port to the second video stream, that is, instruct the transmission device to stop forwarding the first video stream through the target egress port and start to forward the second video stream through the target egress port.

S130. The transmission device determines switching reference information of a reference frame trailer packet of the first video stream (subsequently referred to as a first reference frame trailer packet) and switching reference information of a reference frame trailer packet of the second video stream (subsequently referred to as a second reference frame trailer packet) according to the switching instruction.

The switching reference information of the first reference frame trailer packet and the switching reference information of the second reference frame trailer packet each may be a sequence number or a timestamp, or each may include a sequence number and a timestamp.

The last but (x−1) frame trailer packet of the first video stream and the last but (x−1) frame trailer packet of the second video stream that are received before step S130 is performed may be respectively determined as the first reference frame trailer packet and the second reference frame trailer packet, where x is a natural number, and a value of x may be 1. When x is 1, a reference frame trailer packet of either of the first video stream and the second video stream may also be referred to as a latest frame trailer packet of the video stream when step S130 is performed.

During specific implementation, the switching reference information of the first reference frame trailer packet and the switching reference information of the second reference frame trailer packet may be determined based on a time at which the transmission device receives the switching instruction. The following shows two example implementations.

Figure 3A:
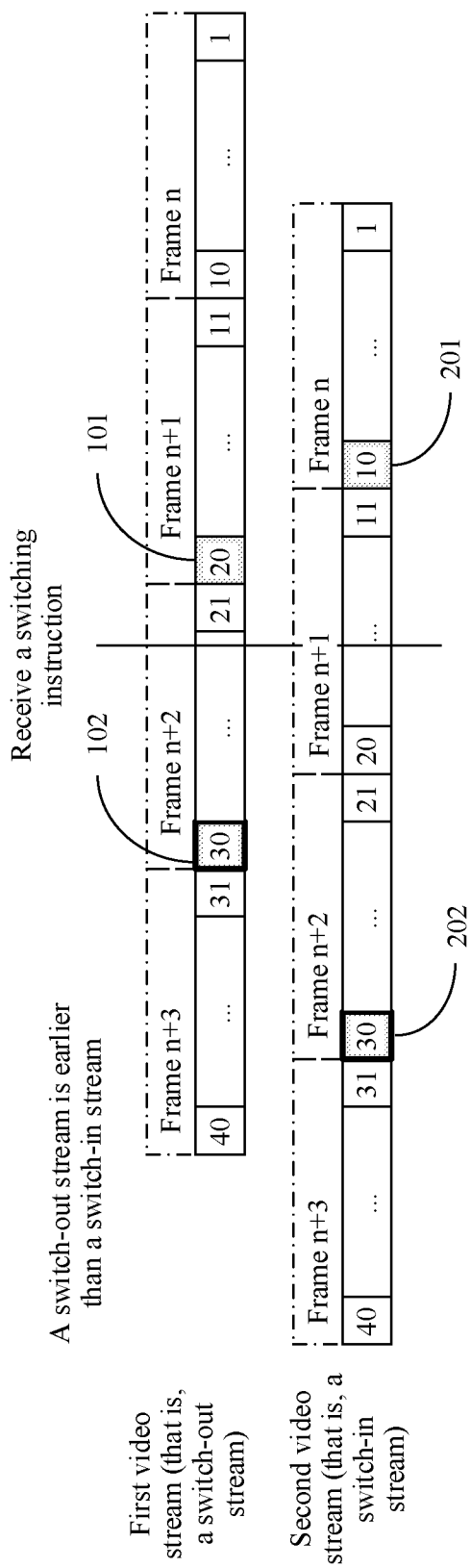
FIG. 3A to FIG. 3C and FIG. 4A to FIG. 4C are schematic diagrams of switching according to an embodiment of the present invention.
Figure 3B:
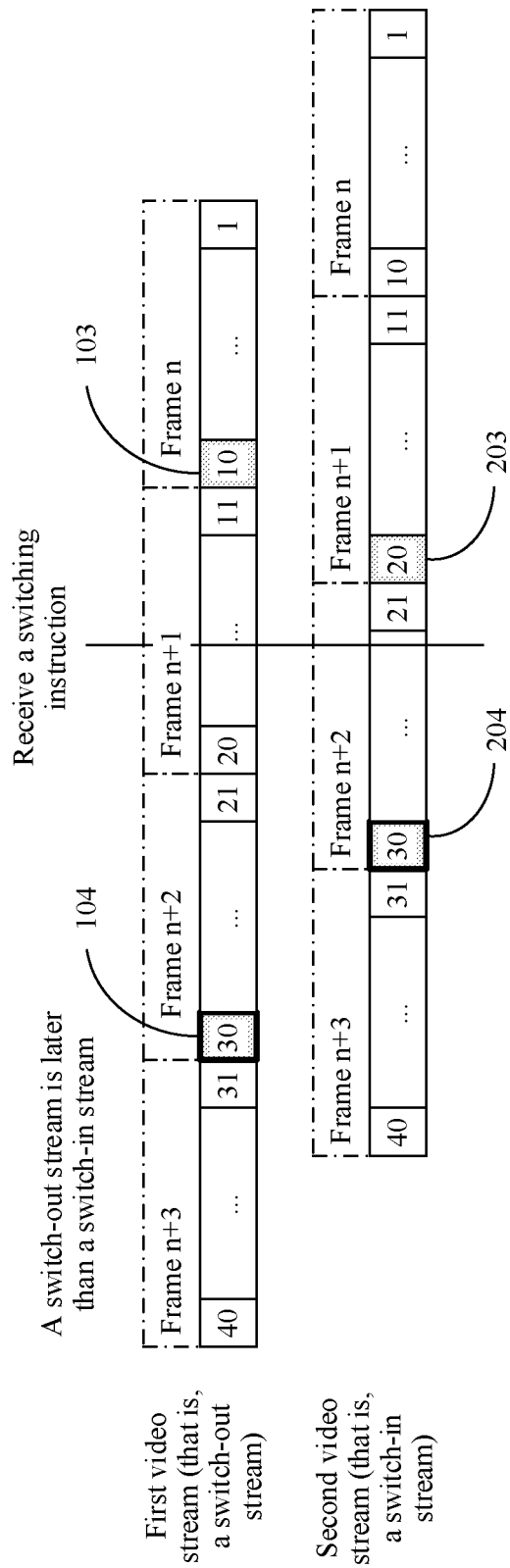
Figure 3C:
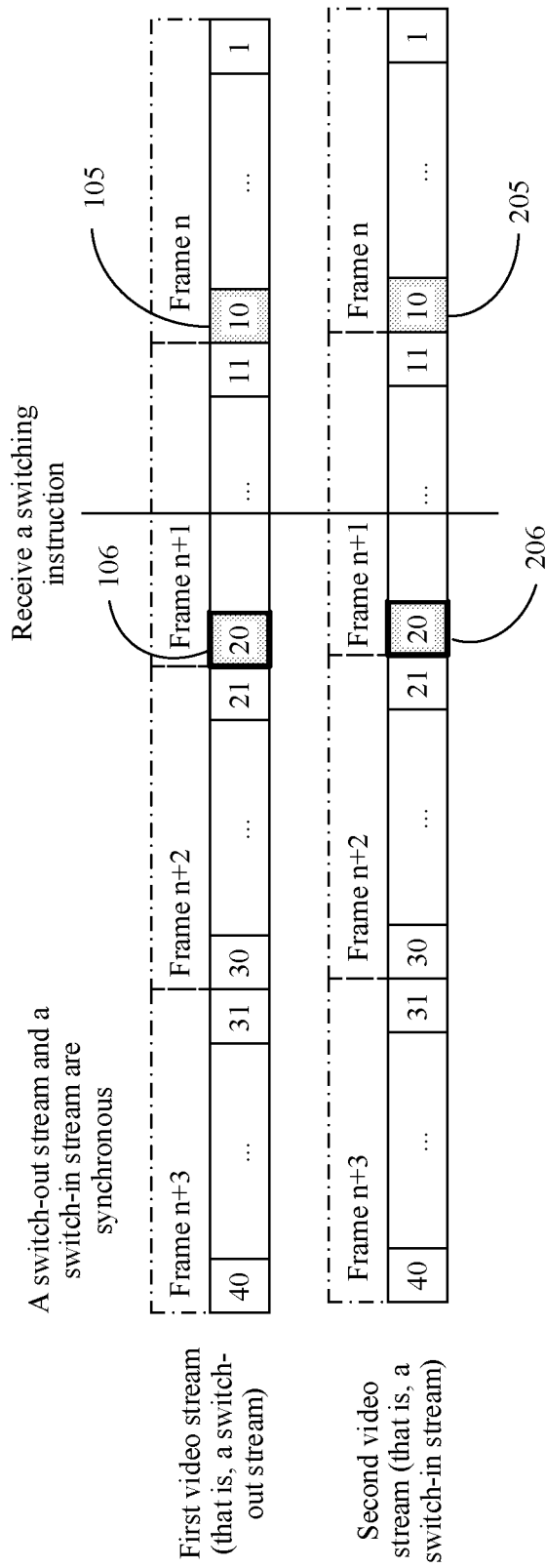

Implementation M: Step S130 is performed immediately after the switching instruction is received. In other words, a time of performing step S120 is very close to a time of performing step S130. In this case, switching reference information of the last but (x−1) frame trailer packet of the first video stream and switching reference information of the last but (x−1) frame trailer packet of the second video stream may be respectively determined as the switching reference information of the first reference frame trailer packet and the switching reference information of the second reference frame trailer packet, where the last but (x−1) frame trailer packet of the first video stream and the last but (x−1) frame trailer packet of the second video stream are received before the switching instruction is received. In other words, the first reference frame trailer packet and the second reference frame trailer packet are respectively the last but (x−1) frame trailer packet of the first video stream and the last but (x−1) frame trailer packet of the second video stream that are received before the switching instruction is received. The first reference frame trailer packet and the second reference frame trailer packet when x is 1 are shown in FIG. 3A to FIG. 3C. As shown in FIG. 3A, a frame trailer packet 101 and a frame trailer packet 201 are respectively determined as the first reference frame trailer packet and the second reference frame trailer packet, and sequence numbers of the first reference frame trailer packet and the second reference frame trailer packet are respectively 20 and 10. As shown in FIG. 3B, a frame trailer packet 103 and a frame trailer packet 203 are respectively determined as the first reference frame trailer packet and the second reference frame trailer packet, and sequence numbers of the first reference frame trailer packet and the second reference frame trailer packet are respectively 10 and 20. As shown in FIG. 3C, a frame trailer packet 105 and a frame trailer packet 205 are respectively determined as the first reference frame trailer packet and the second reference frame trailer packet, and sequence numbers of the first reference frame trailer packet and the second reference frame trailer packet are respectively 10 and 10.

Figure 4A:
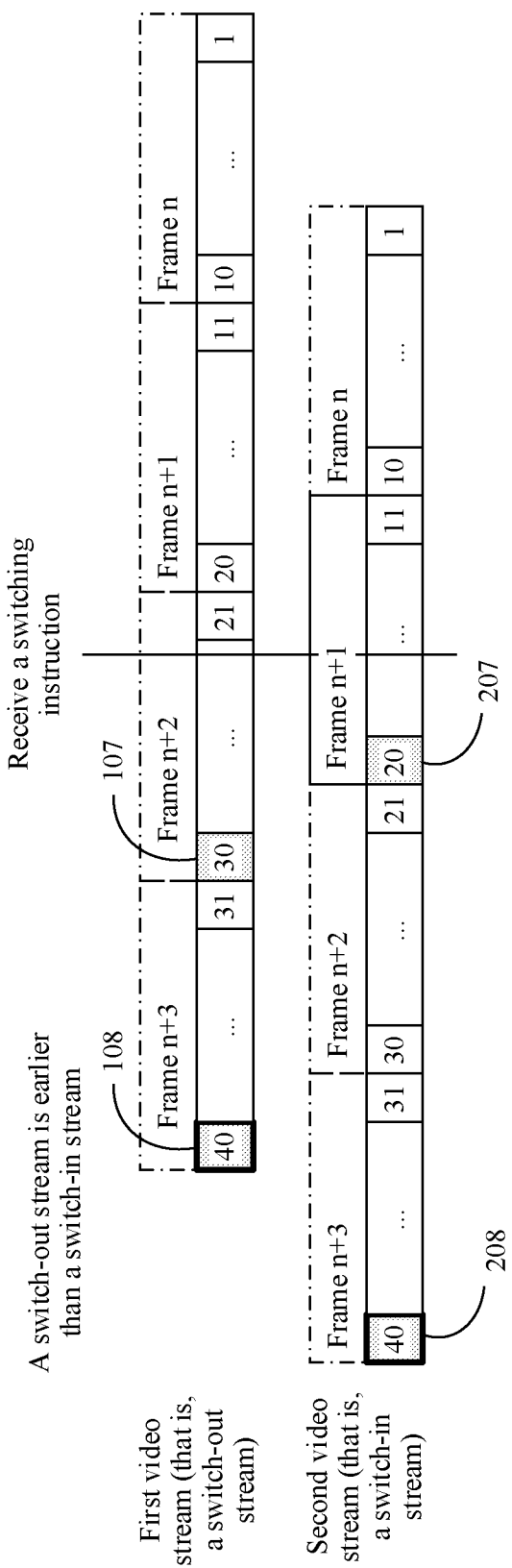
Figure 4B:
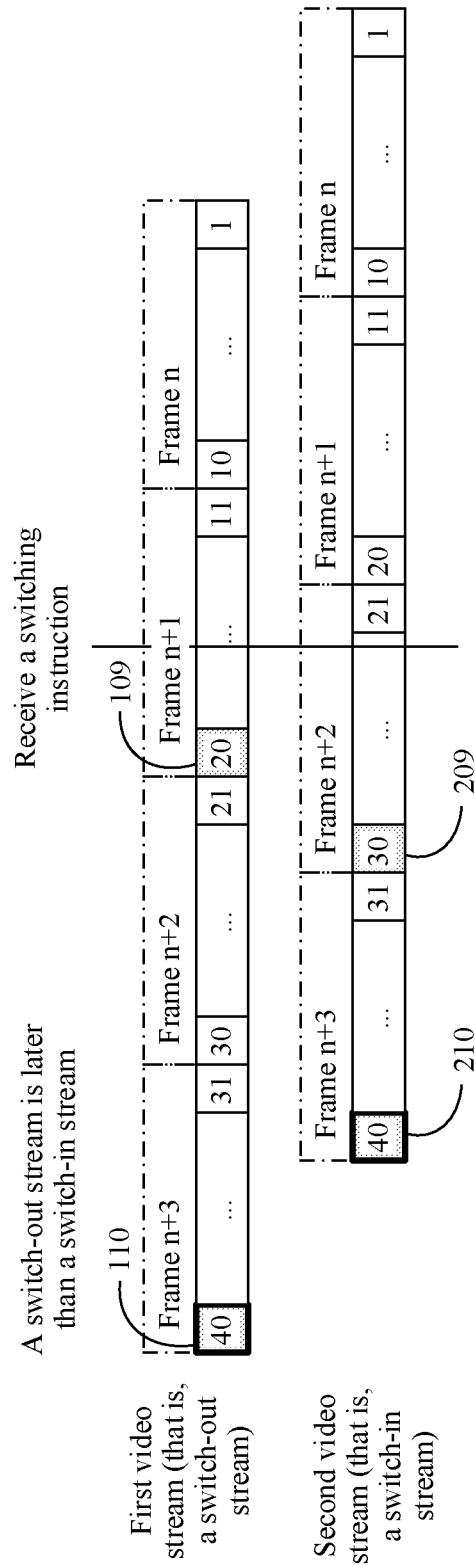
Figure 4C:
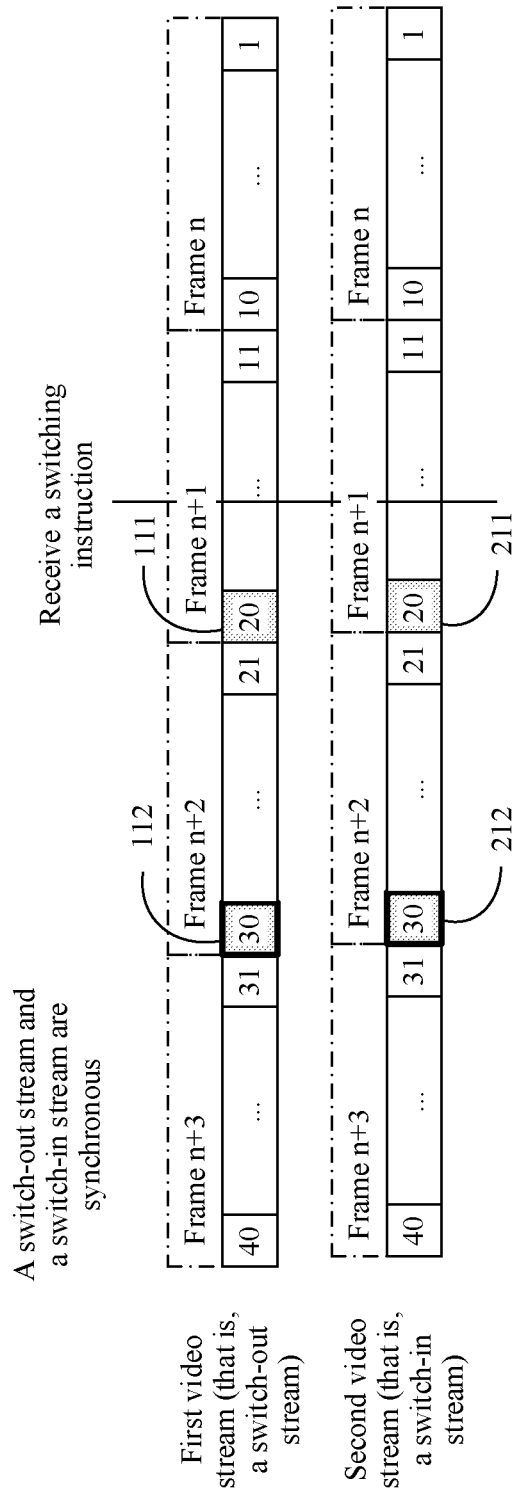

Implementation N: Step S130 is performed after at least one trailer packet of the first video stream and at least one trailer packet of the second video stream are separately received after the switching instruction is received. Step S130 may be performed when the at least one frame trailer packet of the first video stream and the at least one frame trailer packet of the second video stream are separately received, and switching reference information of the received last frame trailer packet of the first video stream and switching reference information of the received last frame trailer packet of the second video stream are respectively determined as the switching reference information of the first reference frame trailer packet and the switching reference information of the second reference frame trailer packet. As shown in FIG. 4A, a frame trailer packet 107 and a frame trailer packet 207 are respectively determined as the first reference frame trailer packet and the second reference frame trailer packet, and sequence numbers of the first reference frame trailer packet and the second reference frame trailer packet are respectively 30 and 20. As shown in FIG. 4B, a frame trailer packet 109 and a frame trailer packet 209 are respectively determined as the first reference frame trailer packet and the second reference frame trailer packet, and sequence numbers of the first reference frame trailer packet and the second reference frame trailer packet are respectively 20 and 30. As shown in FIG. 4C, a frame trailer packet 111 and a frame trailer packet 211 are respectively determined as the first reference frame trailer packet and the second reference frame trailer packet, and sequence numbers of the first reference frame trailer packet and the second reference frame trailer packet are respectively 20 and 20. If a quantity of packets of a single video frame of the first video stream and a quantity of packets of a single video frame of the second video stream each are calculated based on sequence numbers of adjacent frame trailer packets after the switching instruction is received, step S130 may alternatively be performed when at least two frame trailer packets of the first video stream and at least two frame trailer packets of the second video stream are separately received, and switching reference information of the received last frame trailer packet of the first video stream and switching reference information of the received last frame trailer packet of the second video stream are respectively determined as the switching reference information of the first reference frame trailer packet and the switching reference information of the second reference frame trailer packet.

S140. Determine switching reference information of a switching packet of the first video stream (subsequently referred to as a first switching packet) based on the switching reference information of the first reference frame trailer packet, and determine switching reference information of a switching packet of the second video stream (subsequently referred to as a second switching packet) based on the switching reference information of the second reference frame trailer packet.

The switching reference information of the first reference frame trailer packet, the switching reference information of the second reference frame trailer packet, the switching reference information of the first switching packet, and the switching reference information of the second switching packet each may be a sequence number or a timestamp, or each may include a sequence number and a timestamp.

For ease of description, subsequently, the sequence number of the first switching packet may be referred to as a first switching sequence number, the sequence number of the second switching packet may be referred to as a second switching sequence number, the timestamp of the first switching packet may be referred to as a first switching timestamp, and the sequence number of the second switching packet may be referred to as a second switching timestamp.

A video frame to which video data in the first switching packet belongs is a next video frame of a video frame to which video data in the first reference frame trailer packet belongs or a subsequent video frame of the next video frame, and a video frame to which video data in the second switching packet belongs is a next video frame of a video frame to which video data in the second reference frame trailer packet belongs or a subsequent video frame of the next video frame. When a value of x is 1, in this implementation, video stream switching is performed at a location of at least one frame after a reference frame trailer packet, so as to effectively avoid damage to a currently transmitted video image.

The first switching sequence number may be calculated based on the sequence number of the first reference frame trailer packet and a quantity of packets for encapsulating a single video frame of the first video stream, and the second switching sequence number may be calculated based on the sequence number of the second reference frame trailer packet and a quantity of packets for encapsulating a single video frame of the second video stream. A difference between the determined first switching sequence number and the sequence number of the first reference frame trailer packet may be greater than or equal to the quantity of packets for encapsulating a single video frame of the first video stream, and a difference between the determined second switching sequence number and the sequence number of the second reference frame trailer packet may be greater than or equal to the quantity of packets for encapsulating a single video frame of the second video stream.

The first switching timestamp may be further calculated based on the timestamp of the first reference frame trailer packet and duration of a single video frame of the first video stream, and the second switching timestamp may be further calculated based on the timestamp of the second reference frame trailer packet and duration of a single video frame of the second video stream. A difference between the determined first switching timestamp and the timestamp of the first reference frame trailer packet may be greater than or equal to the duration of the single video frame of the first video stream, and a difference between the determined second switching timestamp and the timestamp of the second reference frame trailer packet may be greater than or equal to the duration of the single video frame of the second video stream.

During specific implementation, the transmission device may first determine switching reference information of an alignment frame trailer packet of the first video stream (subsequently referred to as a first alignment frame trailer packet) based on the switching reference information of the first reference frame trailer packet, and then determine the switching reference information of the first switching packet based on the switching reference information of the first alignment frame trailer packet. For example, the switching reference information of the first alignment frame trailer packet is used as the switching reference information of the first switching packet. For another example, switching reference information of a data packet used to encapsulate blanking area data of a next video frame of a video frame to which video data in the first alignment frame trailer packet belongs is determined as the switching reference information of the first switching packet, and the first alignment frame trailer packet is a subsequent frame trailer packet of the first reference frame trailer packet. In addition, the transmission device may first determine switching reference information of an alignment frame trailer packet of the second video stream (subsequently referred to as a second alignment frame trailer packet) based on the switching reference information of the second reference frame trailer packet of the second video stream, and then determine the switching reference information of the second switching packet based on the switching reference information of the second alignment frame trailer packet. For example, the switching reference information of the second alignment frame trailer packet is used as the switching reference information of the second switching packet. For another example, switching reference information of a data packet used to encapsulate blanking area data of a next video frame of a video frame to which video data in the second alignment frame trailer packet belongs is determined as the switching reference information of the second switching packet, and the second alignment frame trailer packet is a subsequent frame trailer packet of the second reference frame trailer packet. The first alignment frame trailer packet and the second alignment frame trailer packet are temporally corresponding frame trailer packets. To be specific, for the first alignment frame trailer packet, the second alignment frame trailer packet is a frame trailer packet whose timestamp is closest to the timestamp of the first alignment frame trailer packet in all frame trailer packets of the second video stream. It may be understood that, for a video frame corresponding to the first alignment frame trailer packet, a video frame corresponding to the second alignment frame trailer packet is a video frame that is temporally closest to the video frame corresponding to the first alignment frame trailer packet in all video frames of the second video stream. The switching reference information of the first reference frame trailer packet, the switching reference information of the second reference frame trailer packet, the switching reference information of the first alignment frame trailer packet, the switching reference information of the second alignment frame trailer packet, the switching reference information of the first switching packet, and the switching reference information of the second switching packet each may be a sequence number or a timestamp, or each may include a sequence number and a timestamp.

In one or a combination of an implementation A and an implementation B, switching reference information of an alignment trailer packet of either of the first video stream and the second video stream may be determined, and switching reference information of a switching packet of the video stream may be determined. The implementation A is used to determine a sequence number of the switching packet, and the implementation B is used to determine a timestamp of the switching packet.

Implementation A:

In the implementation A, the transmission device may first calculate a sequence number of the first alignment frame trailer packet based on the sequence number of the first reference frame trailer packet and a quantity of packets of a single video frame of the first video stream, and then determine the sequence number of the first switching packet based on the sequence number of the first alignment frame trailer packet. In addition, the transmission device may first calculate a sequence number of the second alignment frame trailer packet based on the sequence number of the second reference frame trailer packet of the second video stream and a quantity of packets of a single video frame of the second video stream, and then determine the sequence number of the second switching packet based on the sequence number of the second alignment frame trailer packet.

As shown in FIG. 3A, the sequence number 20 of the first reference frame trailer packet 101 and the sequence number 10 of the second reference frame trailer packet 201 are recorded before the switching instruction is received, and a sequence number of an alignment frame trailer packet is immediately determined after the switching instruction is received. The determined sequence number of the first alignment frame trailer packet is a sequence number 30 of a frame trailer packet 102, in other words, the first alignment frame trailer packet is the frame trailer packet 102. The determined sequence number of the second alignment frame trailer packet is a sequence number 30 of a frame trailer packet 202, in other words, the second alignment frame trailer packet is the frame trailer packet 202. The frame trailer packet 102 and the frame trailer packet 202 are temporally corresponding frame trailer packets. It is assumed that the first video stream and the second video stream have a same frame rate and a same start frame number, and both the frame trailer packet 102 and the frame trailer packet 202 are frame trailer packets of a video frame whose frame number is n+2.

A sequence number of an alignment frame trailer packet of either of the first video stream and the second video stream may be determined in one of the following two implementations of the implementation A (an implementation A1 and an implementation A2).

Implementation A1: Considering a problem that different video streams may not be synchronized, in the implementation A1, the transmission device first determines a synchronization relationship between the first video stream and the second video stream, and then for either of the first video stream and the second video stream, calculates a sequence number of an alignment frame trailer packet of the video stream based on a sequence number of a reference frame trailer packet of the video stream and the synchronization relationship. The synchronization relationship between the first video stream and the second video stream may be that the first video stream is earlier than the second video stream, the first video stream is later than the second video stream, or the first video stream is synchronized with the second video stream. Out-of-synchronization between video streams that need to be switched usually does not exceed one frame.

After the synchronization relationship between the first video stream and the second video stream is determined, the sequence number of the first alignment frame trailer packet of the first video stream and the sequence number of the second alignment frame trailer packet of the second video stream are determined in the following manner. For ease of description, in this embodiment of the present invention, the sequence number of the first reference frame trailer packet is represented as S11, the sequence number of the first alignment frame trailer packet is represented as S12, the sequence number of the second reference frame trailer packet is represented as S21, and the sequence number of the second alignment frame trailer packet is represented as S22. The quantity of packets of the single video frame of the first video stream is represented as M1, the quantity of packets of the single video frame of the second video stream is represented as M2, and M1 and M2 may be the same or may be different, and are usually the same. In an example of the following manner, it is assumed that both M1 and M2 are 10.

When the determined synchronization relationship between the first video stream and the second video stream is that the first video stream is earlier than the second video stream, the sequence number S12 of the first alignment frame trailer packet is determined according to a formula S12=S11+m×M1, and the sequence number S22 of the second alignment frame trailer packet is determined according to a formula S22=S21+(m+1)×M2. Herein, m is a natural number, and may be 1.

It is assumed that m is 1 and the implementation M is used. As shown in FIG. 3A, the first reference frame trailer packet is the frame trailer packet 101, the sequence number of the first reference frame trailer packet is 20, and the sequence number of the first alignment frame trailer packet 102 is 20+10, that is, 30. The second reference frame trailer packet is the frame trailer packet 201, and the sequence number of the second reference frame trailer packet is 10, and the sequence number of the second alignment frame trailer packet 202 is 10+2×10, that is, 30.

It is assumed that m is 1 and the implementation N is used. As shown in FIG. 4A, the first reference frame trailer packet is the frame trailer packet 107, the sequence number of the first reference frame trailer packet is 30, and the sequence number of the first alignment frame trailer packet 108 is 30+10, that is, 40. The second reference frame trailer packet is the frame trailer packet 207, the sequence number of the second reference frame trailer packet is 20, and the sequence number of the second alignment frame trailer packet 208 is 20+2×10, that is, 40.

When the determined synchronization relationship between the first video stream and the second video stream is that the first video stream is later than the second video stream, the sequence number S12 of the first alignment frame trailer packet is determined according to a formula S12=S11+(n+1)×M1, and the sequence number S22 of the second alignment frame trailer packet is determined according to a formula S22=S21+n×M2. Herein, n is a natural number, and may be 1.

It is assumed that n is 1 and the implementation M is used. As shown in FIG. 3B, the first reference frame trailer packet is the frame trailer packet 103, the sequence number of the first reference frame trailer packet is 10, and the sequence number of the first alignment frame trailer packet 104 is 10+2×10, that is, 30. The second reference frame trailer packet is the frame trailer packet 203, the sequence number of the second reference frame trailer packet is 20, and the sequence number of the second alignment frame trailer packet 204 is 20+10, that is, 30.

It is assumed that n is 1 and the implementation N is used. As shown in FIG. 4B, the first reference frame trailer packet is the frame trailer packet 109, the sequence number of the first reference frame trailer packet is 20, and the sequence number of the first alignment frame trailer packet 110 is 20+2×10, that is, 40. The second reference frame trailer packet is the frame trailer packet 209, the sequence number of the second reference frame trailer packet is 30, and the sequence number of the second alignment frame trailer packet 210 is 30+10, that is, 40.

When the determined synchronization relationship between the first video stream and the second video stream is that the first video stream is synchronized with the second video stream, the sequence number S12 of the first alignment frame trailer packet is determined according to a formula S12=S11+k×M1, and the sequence number S22 of the second alignment frame trailer packet is determined according to a formula S22=S21+k×M2. Herein, k is a natural number, and may be 1.

It is assumed that k is 1 and the implementation M is used. As shown in FIG. 3C, the first reference frame trailer packet is the frame trailer packet 105, the sequence number of the first reference frame trailer packet is 10, and the sequence number of the first alignment frame trailer packet 106 is 10+10, that is, 20. The second reference frame trailer packet is the frame trailer packet 205, the sequence number of the second reference frame trailer packet is 10, and the sequence number of the second alignment frame trailer packet 206 is 10+10, that is, 20.

It is assumed that k is 1 and the implementation N is used. As shown in FIG. 4C, the first reference frame trailer packet is the frame trailer packet 111, the sequence number of the first reference frame trailer packet is 20, and the sequence number of the first alignment frame trailer packet 112 is 20+10, that is, 30. The second reference frame trailer packet is the frame trailer packet 211, the sequence number of the second reference frame trailer packet is 20, and the sequence number of the second alignment frame trailer packet 212 is 20+10, that is, 30.

Timestamps of the frame trailer packets (that is, the first alignment frame trailer packet and the second alignment frame trailer packet) corresponding to the sequence number of the first alignment frame trailer packet and the sequence number of the second alignment frame trailer packet that are determined in the implementation A1 are basically the same, and timestamps of the switching packets that are determined based on the timestamps of the frame trailer packets are also basically the same. Therefore, it can be ensured that a switch-out stream is synchronized with a switch-in stream in a time dimension during switching, and there is no frame redundancy or frame lack.

Implementation A2: In the implementation A2, a synchronization relationship between different video streams is not considered, but it is assumed that the video streams are synchronized. The sequence number S12 of the first alignment frame trailer packet may be directly determined according to a formula S12=S11+k×M1, and the sequence number S22 of the second alignment frame trailer packet may be directly determined according to a formula S22=S21+k×M2.

After the sequence number of the first alignment frame trailer packet and the sequence number of the second alignment frame trailer packet are determined, the first switching sequence number and the second switching sequence number may be respectively determined in one of the following two implementations (an implementation X1 and an implementation X2) based on the sequence number of the first alignment frame trailer packet and the sequence number of the second alignment frame trailer packet.

Implementation X1: The implementation X1 is used to perform video stream switching at a boundary of a frame. In the implementation X1, the sequence number of the first alignment frame trailer packet of the first video stream is used as the first switching sequence number, and the sequence number of the second alignment frame trailer packet of the second video stream is used as the second switching sequence number.

As shown in FIG. 3A, the sequence number 30 of the first alignment frame trailer packet 102 is used as the first switching sequence number, in other words, the first alignment frame trailer packet 102 is used as the switching packet of the first video stream, and the sequence number 30 of the second alignment frame trailer packet 202 is used as the second switching sequence number, in other words, the second alignment frame trailer packet 202 is used as the switching packet of the second video stream.

Implementation X2: The implementation X2 is used to perform video stream switching in a blanking area of a video frame.

In the video field, in a scanning process of converting an optical signal into an electrical signal, the scanning always starts from an upper left corner of an image and moves horizontally to the right, and a scanning point also moves downwards at a relatively low rate. When the scanning point arrives at the right edge of the image, the scanning point quickly returns to the left to restart to scan the second row below a start point of the first row. A return process between rows is referred to as horizontal blanking. A complete image scanning signal includes a sequence of row signals separated by horizontal blanking intervals, and is referred to as a frame. After scanning a frame, the scanning point needs to return from a lower right corner of the image to the upper left corner of the image to start to scan a new frame. This time interval is referred to as vertical blanking or field blanking. The horizontal blanking and the vertical blanking do not carry visible content in an SDI signal, and are collectively referred to as a blanking area. SMPTE RP-168 specifies a switching row or a switching area to guide switching between video streams in an SDI format. Switching between two SDI signals in the switching row or the switching area does not damage valid video data. In SMPTE 2022-6, an SDI signal is carried in an IP packet. Therefore, when clean switching is performed on a video stream encapsulated based on SMPTE 2022-6, the switching should be performed in the blanking area.

In conclusion, if both the first video stream and the second video stream are video streams encoded based on SMPTE 2022-6, video stream switching may be performed at a data packet for encapsulating a blanking area.

For the first video stream, a sequence number of a data packet used to encapsulate blanking area data of a next video frame of a video frame corresponding to the sequence number of the first alignment frame trailer packet may be determined as the first switching sequence number. For example, a sum of the sequence number of the first alignment frame trailer packet of the first video stream and $\Delta M1$ is determined as the first switching sequence number, where $\Delta M1=[OL1 \times SL1/1376]+1$ or $\Delta M1=[OL1 \times SL1/13761$, OL1 is a quantity of bytes occupied by pixels in each row in a single video frame of the first video stream, and SL1 is a switching row number of the first video stream.

For the second video stream, a sequence number of a data packet used to encapsulate blanking area data of a next video frame of a video frame corresponding to the sequence number of the second alignment frame trailer packet is determined as the second switching sequence number. For example, a sum of the sequence number of the second alignment frame trailer packet of the second video stream and $\Delta M2$ is determined as the second switching sequence number, where $\Delta M2=[OL2 \times SL2/1376]+1$ or $\Delta M1=[OL2 \times SL2/13761$, OL2 is a quantity of bytes occupied by pixels in each row in a single video frame of the second video stream, and SL2 is a switching row number of the second video stream.

A switching row number may depend on an SDI video standard. Currently, SMPTE RP-168 specifies switching row numbers of most video formats. The switching row number SL1 of the first video stream and the switching row number SL2 of the second video stream are usually the same.

For either of the first video stream and the second video stream, if a 4:2:2 sampling manner is used, a quantity OL of bytes occupied by pixels in each row in a single video frame of the video stream is equal to PL×BS×2/8, where PL is a total quantity of pixels in each row of the video frame of the video stream (including a quantity of row blanking pixels and a quantity of valid video pixels), and BS is a pixel bit depth. It may be understood that, if pixel bit depths and sampling manners of the first video stream and the second video stream are the same, the OL1 and the OL2 are usually the same.

Implementation B:

In the implementation B, the transmission device may first calculate a timestamp of the first alignment frame trailer packet based on the timestamp of the first reference frame trailer packet and duration of a single video frame of the first video stream, and then determine the timestamp of the first switching packet based on the timestamp of the first alignment frame trailer packet. In addition, the transmission device may first calculate a timestamp of the second alignment frame trailer packet based on the timestamp of the second reference frame trailer packet of the second video stream and duration of a single video frame of the second video stream, and then determine the timestamp of the second switching packet based on the timestamp of the second alignment frame trailer packet.

A timestamp of an alignment frame trailer packet of either of the first video stream and the second video stream may be determined in one of the following two implementations of the implementation B (an implementation B1 and an implementation B2).

Implementation B1: Considering a problem that different video streams may not be synchronized, in the implementation B1, the transmission device first determines a synchronization relationship between the first video stream and the second video stream, and then for either of the first video stream and the second video stream, calculates a timestamp of an alignment frame trailer packet of the video stream based on a timestamp of a reference frame trailer packet of the video stream and the synchronization relationship. The synchronization relationship between the first video stream and the second video stream may be that the first video stream is earlier than the second video stream, the first video stream is later than the second video stream, or the first video stream is synchronized with the second video stream. Out-of-synchronization between video streams that need to be switched usually does not exceed one frame.

After the synchronization relationship between the first video stream and the second video stream is determined, the timestamp of the first alignment frame trailer packet of the first video stream and the timestamp of the second alignment frame trailer packet of the second video stream are determined in the following manner. For ease of description, in this embodiment of the present invention, the timestamp of the first reference frame trailer packet is represented as t11, the timestamp of the first alignment frame trailer packet is represented as t12, the timestamp of the second reference frame trailer packet is represented as t21, and the timestamp of the second alignment frame trailer packet is represented as t22. The duration of the single video frame of the first video stream is represented as T1, the duration of the single video frame of the second video stream is represented as T2, and T1 and T2 may be the same or may be different, and are usually the same.

When the determined synchronization relationship between the first video stream and the second video stream is that the first video stream is earlier than the second video stream, the timestamp t12 of the first alignment frame trailer packet is determined according to a formula t12=t11+m×T1, and the timestamp t22 of the second alignment frame trailer packet is determined according to a formula t22=t21+(m+1)×T2. Herein, m is a natural number, and may be 1.

When the determined synchronization relationship between the first video stream and the second video stream is that the first video stream is later than the second video stream, the timestamp t12 of the first alignment frame trailer packet is determined according to a formula t12=t11+(n+1)×T1, and the timestamp t22 of the second alignment frame trailer packet is determined according to a formula t22=t21+n×T2. Herein, n is a natural number, and may be 1.

When the determined synchronization relationship between the first video stream and the second video stream is that the first video stream is synchronized with the second video stream, the timestamp t12 of the first alignment frame trailer packet is determined according to a formula t12=t11+k×T1, and the timestamp t22 of the second alignment frame trailer packet is determined according to a formula t22=t21+k×T2. Herein, k is a natural number, and may be 1.

The timestamps of the first alignment frame trailer packet and the second alignment frame trailer packet that are determined in the implementation B1 are basically consistent, and timestamps of the switching packets that are determined based on the timestamps of the first alignment frame trailer packet and the second alignment frame trailer packet are also basically consistent. Therefore, it can be ensured that a switch-out stream is synchronized with a switch-in stream in a time dimension during switching, and there is no frame redundancy or frame lack.

Implementation B2: In the implementation B2, a synchronization relationship between different video streams is not considered, but it is assumed that the video streams are synchronized. The timestamp t12 of the first alignment frame trailer packet may be directly determined according to a formula t12=t11+k×T1, and the timestamp t22 of the second alignment frame trailer packet may be directly determined according to a formula t22=t21+k×T2.

After the switching reference information of the first alignment frame trailer packet and the timestamp of the second alignment frame trailer packet are determined, the first switching timestamp and the second switching timestamp may be respectively determined in one of the following two implementations (an implementation Y1 and an implementation Y2) based on the timestamp of the first alignment frame trailer packet and the timestamp of the second alignment frame trailer packet.

Implementation Y1: The implementation Y1 is used to perform video stream switching at a boundary of a frame. In the implementation Y1, the timestamp of the first alignment frame trailer packet of the first video stream is used as the first switching timestamp, and the timestamp of the second alignment frame trailer packet of the second video stream is used as the second switching timestamp.

Implementation Y2: The implementation Y2 is used to perform video stream switching in a blanking area of a video frame.

For the first video stream, a timestamp of a data packet used to encapsulate blanking area data of a next video frame of a video frame corresponding to the timestamp of the first alignment frame trailer packet may be determined as the first switching timestamp. For example, a sum of the timestamp of the first alignment frame trailer packet of the first video stream and Δt1 is determined as the first switching timestamp, where Δt1 is a value in an interval [tx, ty]. For example, Δt1 is tx or (tx+ty)/2, where tx=T1×SL1/L1, ty=T1×(SL1+1)/L1, SL1 is a switching row number of the first video stream, and L1 is a total quantity of rows of pixels of a video frame of the first video stream.

For the second video stream, a timestamp of a data packet used to encapsulate blanking area data of a next video frame of a video frame corresponding to the timestamp of the second alignment frame trailer packet is determined as the second switching timestamp. For example, a sum of the timestamp of the second alignment frame trailer packet of the second video stream and Δt2 is determined as the second switching timestamp, where Δt2 is a value in an interval [tm, tn]. For example, Δt2 is tm or (tm+tn)/2, where tm=T2×SL2/L2, ty=T2×(SL2+1)/L2, SL2 is a switching row number of the second video stream, and L2 is a total quantity of rows of pixels of a video frame of the second video stream. It should be noted that Δt1 and Δt2 are calculated according to a same method. For example, Δt1 is calculated according to a formula Δt1=T1×SL1/L1 (that is, Δt1 is tx), and Δt2 is calculated according to a formula Δt2=T2×SL2/L2 (that is, Δt2 is tm).

A switching row number may depend on an SDI video standard. Currently, SMPTE RP-168 specifies switching row numbers of most video formats. The switching row number SL1 of the first video stream and the switching row number SL2 of the second video stream are usually the same. L2 of the first video stream and L2 of the second video stream are usually the same.

In Embodiment 1 of the present invention, the transmission device may determine the synchronization relationship between the first video stream and the second video stream based on the timestamp of the reference frame trailer packet of the first video stream and the timestamp of the reference frame trailer packet of the second video stream.

Because of a precision deviation of device synchronization, there may be a deviation between timestamps of data packets sent by different video source devices at a same moment. In addition, information is transmitted in one packet in an IP network, and a jitter of packet forwarding may cause some synchronization deviations. Therefore, it may be considered that two video streams are synchronized if a deviation between timestamps of two reference frame trailer packets is less than a preset time difference threshold. A time difference threshold used to determine whether synchronization is performed may be determined based on clock synchronization precision of a video source device in a network.

When determining that t1−t2>Δt1, the transmission device may determine that the first video stream is earlier than the second video stream. When determining that t2−t1>Δt1, the transmission device may determine that the first video stream is later than the second video stream. When determining |t1−t2|<Δt2, the transmission device may determine that the first video stream is synchronized with the second video stream. Herein, t1 is the timestamp of the first reference frame trailer packet, t2 is the timestamp of the second reference frame trailer packet, Δt1 is a preset first time difference threshold, Δt2 is a preset second time difference threshold, both Δt1 and Δt2 are values greater than 0 and less than T, and Δt2 may be less than or equal to Δt1. In addition, Δt1 and Δt2 may be preset as follows: T/2<Δt1<T. For example, Δt1 may be 3×T/4, and 0<Δt2<T/2. For example, Δt2 may be T/4, and T is duration of a single video frame. In this embodiment of the present invention, T may be preset, or may be obtained through calculation based on preset video information (for example, a frame rate). In addition, because duration of a single video frame of one video stream and duration of a single video frame of the other video stream are usually the same, where the video streams need to be switched, T may alternatively be obtained through calculation based on a received data packet of either of the first video stream and the second video stream, for example, obtained through calculation based on a difference between timestamps of two adjacent frame trailer packets of the video stream.

S150. The transmission device switches from the first video stream sent through the target egress port to the second video stream based on the switching reference information of the first switching packet and the switching reference information of the second switching packet.

In an implementation, the switching reference information of the first switching packet and the switching reference information of the second switching packet each are a sequence number, and the transmission device may not send, through the target egress port, a received data packet obtained when the sequence number of the first video stream is greater than the first switching sequence number, but sends, through the target egress port, a received data packet obtained when the sequence number of the second video stream is greater than the second switching sequence number.

Because the first switching sequence number and the second switching sequence number are sequence numbers of data packets that are not received, where the sequence numbers are obtained through calculation, when the first switching sequence number and the second switching sequence number are obtained through calculation, a data packet obtained when the sequence number of the first video stream is less than or equal to the first switching sequence number and a data packet obtained when the sequence number of the second video stream is less than or equal to the second switching sequence number are usually further received. In step S150, the transmission device may determine, based on a sequence number of a received data packet of the first video stream, whether to send the data packet through the target egress port. If the sequence number is less than or equal to the first switching sequence number, the transmission device still sends the data packet through the target egress port. If the sequence number is greater than the first switching sequence number, the transmission device does not send the data packet through the target egress port. Correspondingly, the transmission device may determine, based on a sequence number of a received data packet of the second video stream, whether to send the data packet through the target egress port. If the sequence number is less than or equal to the second switching sequence number, the transmission device does not send the data packet through the target egress port. If the sequence number is greater than the second switching sequence number, the transmission device sends the data packet through the target egress port.

In another implementation, the switching reference information of the first switching packet and the switching reference information of the second switching packet each are a timestamp, and the transmission device may not send, through the target egress port, a received data packet obtained when the timestamp of the first video stream is greater than the first switching timestamp, but sends, through the target egress port, a received data packet obtained when the timestamp of the second video stream is greater than the second switching timestamp. In addition, the transmission device may further send, through the target egress port, a received data packet obtained when the timestamp of the first video stream is less than or equal to the first switching timestamp, but does not send, through the target egress port, a received data packet obtained when the timestamp of the second video stream is less than or equal to the second switching timestamp.

In still another implementation, the switching reference information of the first switching packet and the switching reference information of the second switching packet each include a sequence number and a timestamp. For a received data packet of the first video stream, if an absolute value Dif1 of a difference between a timestamp of the data packet and the timestamp of the first switching packet is greater than a threshold 1 and the timestamp of the data packet is greater than the timestamp of the first switching packet, or if Dif1 is less than or equal to a threshold 1 and a sequence number of the data packet is greater than the sequence number of the first switching packet, the data packet is not forwarded through the target egress port. For a received data packet of the second video stream, if an absolute value Dif2 of a difference between a timestamp of the data packet and the timestamp of the second switching packet is greater than a threshold 2 and the timestamp of the data packet is greater than the timestamp of the second switching packet, or if Dif2 is less than or equal to a threshold 2 and a sequence number of the data packet is greater than the sequence number of the second switching packet, the data packet is forwarded through the target egress port. In addition, for a received data packet of the first video stream, if Dif1 is greater than a threshold 1 and a timestamp of the data packet is less than the timestamp of the first switching packet, or if Dif1 is less than or equal to a threshold 1 and a sequence number of the data packet is less than or equal to the sequence number of the first switching packet, the data packet is forwarded through the target egress port. For a received data packet of the second video stream, if Dif2 is greater than a threshold 2 and the timestamp of the data packet is less than the timestamp of the second switching packet, or if Dif2 is less than or equal to a threshold 2 and a sequence number of the data packet is less than the sequence number of the second switching packet, the data packet is not forwarded through the target egress port.

The threshold 1 and the threshold 2 may be the same or may be different, and each may be set to a value greater than or equal to $1/4T$. The threshold 1 and the threshold 2 each may be set to a value greater than or equal to $1/4T$ and less than or equal to $7/4T$, for example, $3/4T$. Herein, T is duration of a single video frame of the first video stream or the second video stream.

For either of the first video stream and the second video stream, after it is determined that the video stream enters a stable state, for example, after it is determined that a predetermined quantity (for example, M or 2M) of data packets of the data stream have been processed after step S150 starts to be performed, or after it is determined that preset duration (for example, T or 2T) elapses after step S130 starts to be performed, a probability that a data packet obtained when a sequence number or a timestamp of the data stream is less than or equal to a switching sequence number or a switching timestamp of the data stream is received is very low. Therefore, whether to send a received data packet of the data stream through the target egress port may not be determined by checking a sequence number or a timestamp of the data packet, but is determined based on status information used to indicate whether a data stream (that is, the data stream) to which the data packet belongs is a data stream that needs to be sent. In this way, forwarding efficiency is improved. Herein, M is a quantity of packets of a single video frame of the video stream, and T is duration of the single video frame of the video stream.

It should be noted that the transmission device may include a plurality of egress ports. If steps S110 and S150 in the method 100 are performed by a unit that is only responsible for processing a data packet corresponding to the target egress port, in steps S110 and S150, the unit may discard a data packet that does not need to be forwarded through the target egress port.

To reduce impact on a downstream device, so that the downstream device does not sense switching, when forwarding the data packet of the second video stream, the transmission device may further modify information in the data packet of the second video stream.

To improve consistency of video streams before and after switching, the transmission device may modify a value of a first field in the data packet of the second video stream, so that the value of the first field in the data packet of the second video stream after switching is the same as a value of a first field in the data packet of the first video stream before switching, where the data packet of the second video stream and the data packet of the first video stream are sent through the target egress port. The first field may be a multicast address field or a payload type field. If the RTP is used for video stream transmission, the first field may alternatively be a synchronization source (Synchronization source, SSRC) field. The first field may alternatively be an HBRMT layer parameter defined in SMPTE 2022-6, for example, FRCount. FRCount is a frame count (Frame Count) field in a high bit rate media payload header (High Bit Rate Media Payload Header) defined in SMPTE 2022-6, and indicates a quantity of accumulated video frames in a video stream.

For an egress port, a plurality of input video streams may need to be switched repeatedly. Therefore, a current switch-out stream may be a previous switch-in stream.

When sending any one of the plurality of video streams through the target egress port, the transmission device may modify a value of a first field in a data packet of the video stream to a preset value, for example, modify a multicast address in the data packet of the video stream to a preset multicast address (for example, 239.0.2.1).

As described in S110, the transmission device may receive a plurality of video streams corresponding to the target egress port, send one of the plurality of video streams through the target egress port, and switch, in the plurality of video streams, the video stream sent through the target egress port. For example, the plurality of video streams include a stream 1, a stream 2, and a stream 3. The transmission device first forwards the stream 2, and then sequentially switches to the stream 1 and the stream 3. When forwarding one (for example, the stream 2) of the plurality of video streams for the first time through the target egress port, the transmission device may further record a value of a first field of the video stream, and when subsequently switching to another video stream, modify a value of a first field in a data packet of the another video stream to the recorded value of the first field of the video stream. For example, when switching to the stream 1, the transmission device modifies a value of a first field in a data packet of the stream 1 to the value of the first field of the stream 2, and when switching to the stream 3, also modifies a value of a first field in a data packet of the stream 3 to the value of the first field of the stream 2.

To improve continuity of video streams before and after switching, when sending the data packet of the second video stream after switching, the transmission device may further modify a value of a second field in the data packet of the second video stream, so that the value of the second field in the data packet of the second video stream after switching is continuous with a value of a second field in the data packet of the first video stream before switching, where the data packet of the second video stream and the data packet of the first video stream are sent through the target egress port. The value of the second field may be one or more of a sequence number, a frame number, a timestamp, and the like.

To ensure that values (for example, sequence numbers) of second fields are continuous, a value of a second field in a to-be-sent data packet of the second video stream may be increased by ΔV. Herein, ΔV=V1−V2, V1 is a value of a second field carried when a data packet obtained when the sequence number of the first video stream is equal to the first switching sequence number is sent through the target egress port, and V2 is a value of a second field carried when a data packet obtained when the sequence number of the second video stream is equal to the second switching sequence number is received.

Before performing step S130, the transmission device may further perform step S115 to record target information of a latest frame trailer packet of each of the first video stream and the second video stream. The recorded target information includes at least one of a sequence number and a timestamp of the latest frame trailer packet. Correspondingly, in step S130, the reference frame trailer packet may be determined based on the target information that is of the latest frame trailer packet and that is recorded in step S115. For example, for either of the first video stream and the second video stream, target information (for example, a sequence number) of a latest frame trailer packet that is of the video stream and that is recorded in step S115 for the last time before step S130 is performed is used as switching reference information (for example, a sequence number) of a reference frame trailer packet of the video stream.

The transmission device may start to perform step S115 before step S120. As described in S110, the transmission device may receive a plurality of video streams corresponding to the target egress port, send one of the plurality of video streams through the target egress port, and switch, in the plurality of video streams, the video stream sent through the target egress port. When starting to forward the plurality of video streams through the target egress port, the transmission device starts to record target information of a latest frame trailer packet of each of the plurality of video streams. When the transmission device subsequently needs to switch two of the video streams, the transmission device may perform steps S130 and S140 by using recorded target information of a latest frame trailer packet of each of the two video streams, to determine the switching reference information. When the foregoing implementation M is used, the transmission device may start to perform step S115 before step S120.

Alternatively, the transmission device may start to perform step S115 after step S120. To be specific, after receiving the switching instruction, the transmission device starts to record target information of a latest frame trailer packet of each of two video streams that need to be switched, and further performs steps S130 and S140 based on the recorded target information of the latest frame trailer packet of each of the two video streams, to determine the switching reference information of the switching packet. When the foregoing implementation N is used, the transmission device may start to perform step S115 after step S120.

If the transmission device starts to perform step S115 before step S120, for any one of the plurality of video streams, when receiving the first frame trailer packet in the video stream, the transmission device records target information of the frame trailer packet as target information of a latest frame trailer packet of the video stream, and updates the target information of the latest frame trailer packet of the video stream based on a subsequently received data packet of the video stream. Further, after receiving the switching instruction, the transmission device immediately performs steps S130 and S140 to calculate switching reference information (for example, a sequence number) of a switching packet based on target information (for example, a sequence number) that is of a latest frame trailer packet and that is recorded before the switching instruction is received. As shown in FIG. 3A, the transmission device calculates the first switching sequence number based on the sequence number 20 that is of the latest frame trailer packet 101 of the first video stream and that is recorded before the switching instruction is received, and calculates the second switching sequence number based on the sequence number 10 that is of the latest frame trailer packet 201 of the second video stream and that is recorded before the switching instruction is received.

If the transmission device starts to perform step S115 after step S120, for either of the first video stream and the second video stream, when receiving the first frame trailer packet in the video stream, the transmission device may record target information of the frame trailer packet as target information of a latest frame trailer packet of the video stream. When receiving another frame trailer packet of one video stream, if the transmission device does not receive the first frame trailer packet of the other video stream, the transmission device may update the target information of the latest frame trailer packet of the video stream, until the transmission device receives the first frame trailer packet of the other video stream and correspondingly records target information of a latest frame trailer packet of the other video stream. In addition, if a quantity of packets of a single video frame of the first video stream and a quantity of packets of a single video frame of the second video stream each are calculated based on sequence numbers of adjacent frame trailer packets, at least two frame trailer packets of each video stream are received before the switching sequence number is calculated. Each time a frame trailer packet is received, target information of the frame trailer packet is recorded as target information of a latest frame trailer packet of a video stream to which the frame trailer packet belongs. In addition, a difference between sequence numbers of two received adjacent frame trailer packets may be used as a quantity of packets of a single video frame of a video stream to which the packet belongs, or a difference between timestamps of two received adjacent frame trailer packets may be used as duration of a single video frame of a video stream to which the packet belongs.

As shown in FIG. 4A, the first switching sequence number is calculated based on the sequence number 30 that is of the latest frame trailer packet 107 of the first video stream and that is recorded after the switching instruction is received, and the second switching sequence number is calculated based on the sequence number 20 that is of the latest frame trailer packet 207 of the second video stream and that is recorded after the switching instruction is received.

The transmission device may update target information of a latest frame trailer packet of either of the video streams in the following manner.

Each time the transmission device receives a frame trailer packet of the video stream, the transmission device may update a sequence number of a latest frame trailer packet of the video stream to a sequence number of the frame trailer packet, and update a timestamp of the latest frame trailer packet of the video stream to a timestamp of the frame trailer packet.

During updating, the transmission device may also consider inter-frame packet disorder and a frame trailer packet loss that may happen. If inter-frame packet disorder occurs, to be specific, a non-frame trailer packet of a current frame arrives before a frame trailer packet of a previous frame or is processed by the transmission device before a frame trailer packet of a previous frame, or a frame trailer packet loss occurs, the sequence number of the latest frame trailer packet of the video stream may alternatively be the sequence number of the frame trailer packet that is estimated based on a non-frame trailer packet whose sequence number is greater than that of a frame trailer packet that is not received. Correspondingly, the transmission device may perform updating in the following manner.

When it is determined that a received data packet of the video stream is not a frame trailer packet and a sequence number of the data packet is greater than a sum of the sequence number of the latest frame trailer packet of the video stream and a quantity M of packets of a single video frame of the video stream, the recorded sequence number of the latest frame trailer packet of the video stream is increased by M. If the target information further includes a timestamp, correspondingly, the recorded timestamp of the latest frame trailer packet of the video stream is increased by duration T of a single video frame. When it is determined that a received data packet of the video stream is a frame trailer packet, an update operation may be directly performed. To be specific, the sequence number of the latest frame trailer packet of the video stream is updated to a sequence number of the data packet, and the timestamp of the latest frame trailer packet of the video stream is updated to a timestamp of the data packet, or it may be further determined whether a timestamp of the data packet is greater than the recorded timestamp of the latest frame trailer packet of the video stream, and the update operation is performed only when the timestamp of the data packet is greater than the recorded timestamp of the latest frame trailer packet of the video stream.

The following describes in detail specific implementation of step S115 in a specific implementation.

The transmission device establishes a video stream switching table. If step S115 is performed before step S120, the switching table may include a record of each of the plurality of video streams. If step S115 is performed after step S120, the switching table may include only records of two video streams (that is, the first video stream and the second video stream) that need to be switched, as shown in Table 1.

The switching table may include fields FT_TS and FT_SN, and a value of FT_TS corresponding to each video stream and a value of FT_SN corresponding to each video stream are respectively a timestamp and a sequence number of a latest frame trailer packet of the video stream.

The video stream switching table may further include any one or any combination of fields Flow, Outport, State, FrameTime, and FramePackets. A value of Flow is used to identify a corresponding video stream. A value of Outport corresponding to each video stream is used to record a port number of an egress port corresponding to the video stream, that is, indicates a port of the transmission device through which the video stream is forwarded. In this embodiment of the present invention, video streams corresponding to a same egress port are switched. A value of State corresponding to each video stream is used to record a current state of the video stream, where SW_Forwarding indicates that the video stream is a video stream forwarded by the transmission device, and SW Discard indicates that the video stream is a video stream that is not forwarded by the transmission device through a corresponding egress port. A value of FrameTime corresponding to each video stream is used to record duration of a single video frame of the video stream. If the RTP is used to for video stream transmission, a unit of FrameTime is the same as a unit of a TS field in an RTP header. A value of FramePackets corresponding to each video stream is used to record a quantity of packets of a single video frame of the video stream.

The video stream switching table may further include SW_SN, and a value of SW_SN corresponding to each video stream is used to record a switching sequence number of the video stream.

TABLE 1

| Outport | Flow | State | FrameTime | FramePackets | FT_TS | FT_SN |
|---|---|---|---|---|---|---|
| 6 | 1 | SW_Forwarding | T1 | M1 | TS1 | SN1 |
| 6 | 2 | SW_Discard | T2 | M2 | TS2 | SN2 |

Subsequently, any video stream in the video stream switching table is referred to as a video stream A.

For the video stream A, when any data packet (subsequently referred to as a packet a) of the video stream A is received, it is first determined whether the packet a is a frame trailer packet.

An RTP packet is used as an example. According to a format of an RTP packet header that is defined in RFC 3550, a value of an M (Marker, marker) field in the RTP packet header is used to indicate whether the RTP packet is a frame trailer packet. If the value of M is 1, it indicates that the RTP packet is a frame trailer packet. If the value of M is 0, it indicates that the RTP packet is not a frame trailer packet.

A value of a sequence number (Sequence number, SN) field in the RTP packet header indicates a sequence number of the RTP packet in an RTP stream, and sequence numbers of RTP packets in a same RTP stream increase monotonically by 1. The RTP packet header further includes a timestamp (Timestamp, TS). Video source devices in a multimedia communications system (for example, a TV production and broadcasting system) keep clock synchronization, and values of timestamp fields in RTP packets sent at a same moment are very close. Therefore, values of timestamp fields may be used to determine whether video frames in different video streams are video frames at a same moment, and are used to align different video streams during switching, so as to implement synchronization in a time dimension during switching.

If it is determined that the packet a is a frame trailer packet and is the first frame trailer packet of the video stream A, a value of a TS field and a value of an SN field of the packet a are respectively recorded in an FT_TS field and an FT_SN field that correspond to the video stream A in the first switching table.

If it is determined that the packet a is a frame trailer packet but is not the first frame trailer packet of the video stream A, a value of a TS field of the packet a is compared with a value of an FT_TS field corresponding to the video stream A in the first switching table. If the value of the TS field of the packet a is greater than the value of the FT_TS field corresponding to the video stream A in the first switching table, the packet a is a latest frame trailer packet. Therefore, the value of the FT_TS field and a value of an FT_SN field that correspond to the video stream A in the first switching table are respectively updated to the value of the TS field and a value of an SN field of the packet a. If the value of the TS field of the packet a is less than the value of the FT_TS field corresponding to the video stream A in the first switching table, no update is performed.

If it is determined that the packet a is not a frame trailer packet, it is determined whether inter-frame disorder occurs. Packets may be disordered when being transmitted in a network. When a processor of the transmission device through which the packets pass performs multi-thread concurrent processing on the received packets, the packets may also be disordered during processing. Therefore, a non-frame trailer packet of a frame may arrive at the transmission device before a frame trailer packet of a previous frame or may be processed before a frame trailer packet of a previous frame. If the packet of the frame arrives before the frame trailer packet of the previous frame or is processed before the frame trailer packet of the previous frame, it indicates that inter-frame packet disorder occurs.

If the packet a is not a frame trailer packet, and a sequence number of the packet a is greater than a sum of a sequence number of a latest frame trailer packet of the video stream A and M, that is, the packet a arrives before a frame trailer packet of a previous frame, disorder or a packet loss may occur in the frame trailer packet of the previous frame. In this case, a sum of a value of an FT_TS field and T may be used as an estimated timestamp of the frame trailer packet, and a sum of a value of an FT_SN field and M may be used as an estimated sequence number of the frame trailer packet. In addition, the value of the FT_TS field and the value of the FT_SN field are updated with the estimated timestamp and the estimated sequence number, where the FT_TS field and the FT_SN field correspond to the video stream A in the first switching table. In other words, the value of the FT_TS field is increased by T, and the value of the FT_SN field is increased by M.

Figure 5:
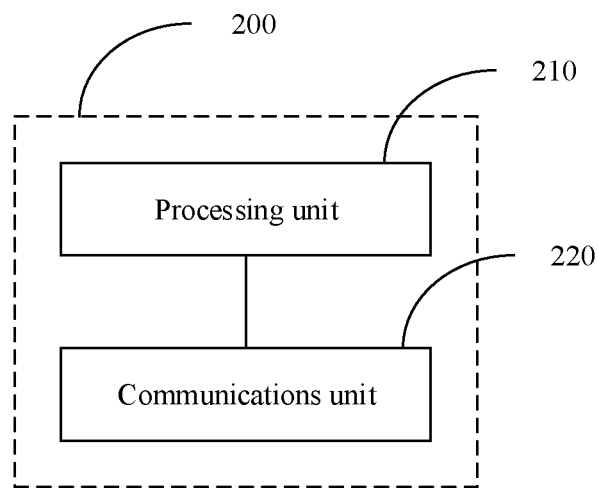
FIG. 5 is a schematic structural diagram of a transmission device 200 according to Embodiment 2 of the present invention.

According to Embodiment 1 of the present invention, Embodiment 2 of the present invention provides a transmission device 200. As shown in FIG. 5, the transmission device 200 includes a processing unit 210 and a communications unit 220.

The communications unit 220 is configured to: receive a first video stream and a second video stream; send the first video stream through a target egress port of the transmission device; and receive a switching instruction, where the switching instruction is used to instruct to switch from the first video stream sent through the target egress port to the second video stream.

The processing unit 210 is configured to: determine switching reference information of a first reference frame trailer packet of the first video stream and switching reference information of a second reference frame trailer packet of the second video stream based on the switching instruction; and determine switching reference information of a first switching packet of the first video stream based on the switching reference information of the first reference frame trailer packet, and determine switching reference information of a second switching packet of the second video stream based on the switching reference information of the second reference frame trailer packet.

The communications unit 220 is further configured to switch from the first video stream sent through the target egress port to the second video stream based on the switching reference information of the first switching packet and the switching reference information of the second switching packet.

The function units described in Embodiment 2 of the present invention may be configured to implement the operations performed by the transmission device in the method in Embodiment 1. The communications unit 220 is configured to communicate with another device, for example, receive control signaling, receive a data packet, forward a data packet, or modify information in a data packet when forwarding the data packet. The processing unit 210 is configured to determine a switching sequence number of a switch-in stream and a switching sequence number of a switch-out stream, and the like.

The processing unit 210 may include a plurality of processing subunits, which separately correspond to an egress port (for example, the foregoing target egress port) of a video stream that needs to be switched. The communications unit 220 may include a plurality of sending subunits, which separately correspond to an egress port of a video stream that needs to be switched. A processing subunit of each egress port determines switching reference information (for example, a sequence number) of a switching packet of a switch-in stream of the egress port and switching reference information of a switching packet of a switch-out stream of the egress port. A sending subunit corresponding to each egress port forwards, through the egress port, a data packet of a video stream that needs to be forwarded through the egress port, and directly discards a data packet of a video stream that does not need to be forwarded through the egress port.

According to the transmission device 200 provided in Embodiment 2 of the present invention, because locations of data packets sent before and after switching are considered during video stream switching, damage caused by a switching operation to a transmitted video image can be effectively reduced.

Figure 6:
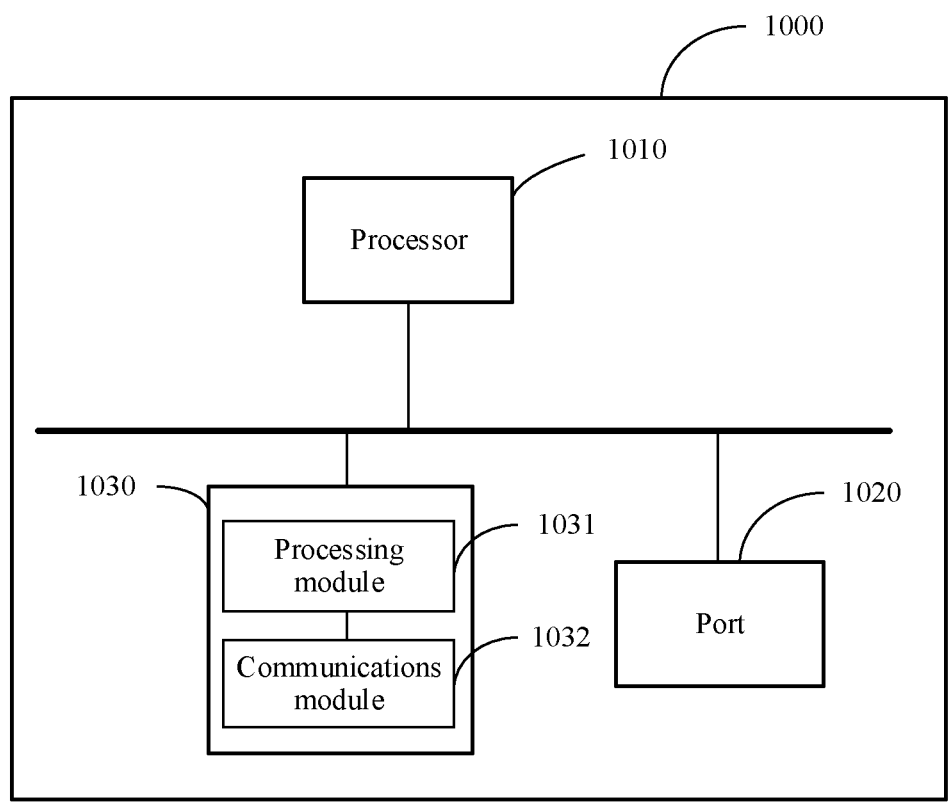
FIG. 6 is a schematic structural diagram of a transmission device 1000 according to Embodiment 3 of the present invention.

According to Embodiments 1 of the present invention, Embodiment 3 of the present invention provides a transmission device 1000. As shown in FIG. 6, the transmission device 1000 includes a processor 1010 and a port 1020.

The processor 1010 is configured to implement the operations performed by the transmission device in the method 100 provided in Embodiment 1 of the present invention. The processor 1010 communicates with another device through the port 1020. The processor 1010 may be a central processing unit (central processing unit, CPU) or an application-specific integrated circuit (Application Specific Integrated Circuit, ASIC), or may be configured as one or more integrated circuits that implement this embodiment of the present invention.

As shown in FIG. 6, the transmission device 1000 may further include a memory 1030. Communication between the processor 1010 and the memory 1030 may be completed by using a bus. The memory 1030 is configured to store a computer operation instruction, and may be a high-speed random access memory (Random Access Memory, RAM) or a non-volatile memory (non-volatile memory). The processor 1010 may execute the computer operation instruction stored in the memory 1030, and execute the computer operation instruction, so that the transmission device 1000 performs the operations performed by the transmission device in the method in Embodiment 1. During specific implementation, the memory 1030 may include a processing module 1031 and a communications module 1032, which are respectively configured to implement the functions of the processing unit 210 and the communications unit 220 shown in FIG. 5. Correspondingly, the processor 1010 implements the function of the processing unit 210 by executing the instruction in the processing module 1031 and implements the function of the communications unit 220 by executing the instruction in the communications module 1032.

According to the transmission device 1000 provided in Embodiment 3 of the present invention, because locations of data packets sent before and after switching are considered during video stream switching, damage caused by a switching operation to a transmitted video image can be effectively reduced.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, or other programmable apparatuses. The computer instruction may be stored in a computer readable storage medium, or transmitted from one computer readable storage medium to another computer readable storage medium. The computer readable storage medium may be any usable medium accessible to the computer. The usable medium may be a magnetic medium (for example, a floppy disk, a hard disk, or a magnetic tape), an optical medium (for example, a DVD), a semiconductor medium (for example, a solid-state drive (Solid State Disk, SSD)), or the like.

What is claimed is:

1. A method for implementing video stream switching, comprising:
   receiving, by a transmission device, a first video stream and a second video stream;
   sending, by the transmission device, the first video stream through a target egress port;
   receiving, by the transmission device, a switching instruction, wherein the switching instruction is used to instruct the transmission device to switch from the first video stream sent through the target egress port to the second video stream;
   obtaining, by the transmission device, first switching reference information of a first switching packet of the first video stream and second switching reference information of a second switching packet of the second video stream, according to the switching instruction; and
   switching, by the transmission device, from the first video stream sent through the target egress port to the second video stream based on the first switching reference information of the first switching packet and the second switching reference information of the second switching packet.

2. The method according to claim 1, wherein obtaining, by the transmission device, the first switching reference information of the first switching packet of the first video stream and the second switching reference information of the second switching packet of the second video stream, according to the switching instruction comprises:

determining, by the transmission device, switching reference information of a first reference frame trailer packet of the first video stream and switching reference information of a second reference frame trailer packet of the second video stream;

determining, by the transmission device the first switching reference information of the first switching packet of the first video stream based on the switching reference information of the first reference frame trailer packet; and determining, by the transmission device, the second switching reference information of the second switching packet of the second video stream based on the switching reference information of the second reference frame trailer packet.

3. The method according to claim 2, wherein:
the first reference frame trailer packet and the second reference frame trailer packet are respectively the last but (x-1) frame trailer packets of the first video stream and the last but (x-1) frame trailer packets of the second video stream that are received before determining the switching reference information of the first reference frame trailer packet and the switching reference information of the second reference frame trailer packet, wherein x is a natural number.

4. The method according to claim 3,
wherein a value of x is 1;
wherein a video frame to which video data in the first switching packet belongs is a next video frame of a video frame to which video data in the first reference frame trailer packet belongs or a subsequent video frame of the next video frame; and
wherein a video frame to which video data in the second switching packet belongs is a next video frame of a video frame to which video data in the second reference frame trailer packet belongs or a subsequent video frame of the next video frame.

5. The method according to claim 2, wherein each of the switching reference information of the first reference frame trailer packet, the switching reference information of the second reference frame trailer packet, the first switching reference information of the first switching packet, and the second switching reference information of the second switching packet comprises a sequence number.

6. The method according to claim 2, wherein each of the switching reference information of the first reference frame trailer packet, the switching reference information of the second reference frame trailer packet, the first switching reference information of the first switching packet, and the second switching reference information of the second switching packet comprises a timestamp.

7. The method according to claim 1, wherein a value of a first field in a data packet of the second video stream sent by the transmission device through the target egress port is the same as a value of a first field in a data packet of the first video stream sent by the transmission device through the target egress port, and wherein the first field is a multicast address field or a payload type field.

8. The method according to claim 7, wherein a value of a second field in the data packet of the second video stream sent by the transmission device through the target egress port is consecutive with a value of a second field in the data packet of the first video stream sent by the transmission device through the target egress port, and the second field is a sequence number field, a frame number field, or a timestamp field.

9. A transmission device, comprising:
a memory, configured to store computer program instructions; and
a processor, configured to read and execute the computer program instructions to cause the transmission device to perform of operations comprising:
receiving a first video stream and a second video stream;
sending the first video stream through a target egress port of the transmission device;
receiving a switching instruction, wherein the switching instruction is used to instruct the transmission device to switch from the first video stream sent through the target egress port to the second video stream;
obtaining first switching reference information of a first switching packet of the first video stream and second switching reference information of a second switching packet of the second video stream; and
switching from the first video stream sent through the target egress port to the second video stream based on the first switching reference information of the first switching packet and the second switching reference information of the second switching packet.

10. The transmission device according to claim 9, wherein obtaining the first switching reference information of the first switching packet of the first video stream and the second switching reference information of the second switching packet of the second video stream comprises:
determining switching reference information of a first reference frame trailer packet of the first video stream and switching reference information of a second reference frame trailer packet of the second video stream according to the switching instruction;
determining the first switching reference information of the first switching packet of the first video stream based on the switching reference information of the first reference frame trailer packet; and
determining the second switching reference information of the second switching packet of the second video stream based on the switching reference information of the second reference frame trailer packet.

11. The transmission device according to claim 10, wherein:
the first reference frame trailer packet and the second reference frame trailer packet are respectively the last but (x-1) frame trailer packets of the first video stream and the last but (x-1) frame trailer packets of the second video stream that are received before determining the switching reference information of the first reference frame trailer packet and the switching reference information of the second reference frame trailer packet, wherein x is a natural number.

12. The transmission device according to claim 11, wherein:
a value of x is 1;
a video frame to which video data in the first switching packet belongs is a next video frame of a video frame to which video data in the first reference frame trailer packet belongs or a subsequent video frame of the next video frame; and
a video frame to which video data in the second switching packet belongs is a next video frame of a video frame to which video data in the second reference frame trailer packet belongs or a subsequent video frame of the next video frame.

13. The transmission device according to claim 10, wherein each of the switching reference information of the first reference frame trailer packet, the switching reference information of the second reference frame trailer packet, the first switching reference information of the first switching packet, and the second switching reference information of the second switching packet comprises a sequence number.

14. The transmission device according to claim 10, wherein each of the switching reference information of the first reference frame trailer packet, the switching reference information of the second reference frame trailer packet, the first switching reference information of the first switching packet, and the second switching reference information of the second switching packet comprises a timestamp.

15. The transmission device according to claim 13, the operations further comprising:
   determining a sequence number of the first switching packet of the first video stream based on a sequence number of the first reference frame trailer packet, wherein determining the sequence number of the first switching packet of the first video stream based on the sequence number of the first reference frame trailer packet comprises:
      determining a sequence number of a first alignment frame trailer packet of the first video stream based on the sequence number of the first reference frame trailer packet and a synchronization relationship between the first video stream and the second video stream, and using the sequence number of the first alignment frame trailer packet as the sequence number of the first switching packet; or
      determining, as the sequence number of the first switching packet, a sequence number of a data packet used to encapsulate blanking area data of a next video frame of a video frame to which video data in the first alignment frame trailer packet belongs; and
   determining a sequence number of the second switching packet of the second video stream based on a sequence number of the second reference frame trailer packet, wherein determining the sequence number of the second switching packet of the second video stream based on the sequence number of the second reference frame trailer packet comprises:
      determining a sequence number of a second alignment frame trailer packet of the second video stream based on the sequence number of the second reference frame trailer packet and the synchronization relationship between the first video stream and the second video stream and using the sequence number of the second alignment frame trailer packet as the sequence number of the second switching packet; or
      determining, as the sequence number of the second switching packet, a sequence number of a data packet used to encapsulate blanking area data of a next video frame of a video frame to which video data in the second alignment frame trailer packet belongs,
   wherein the first alignment frame trailer packet and the second alignment frame trailer packet are temporally corresponding frame trailer packets.

16. The transmission device according to claim 15, the operations further comprising:
   determining the synchronization relationship between the first video stream and the second video stream based on a timestamp of the first reference frame trailer packet and a timestamp of the second reference frame trailer packet.

17. The transmission device according to claim 10, wherein a value of a first field in a data packet of the second video stream sent by the transmission device through the target egress port is the same as a value of a first field in a data packet of the first video stream sent by the transmission device through the target egress port, and wherein the first field is a multicast address field or a payload type field.

18. The transmission device according to claim 17, wherein a value of a second field in the data packet of the second video stream sent by the transmission device through the target egress port is consecutive with a value of a second field in the data packet of the first video stream sent by the transmission device through the target egress port, and wherein the second field is a sequence number field, a frame number field, or a timestamp field.

19. A system for implementing video stream switching, wherein the system comprises:
   at least one processor; and
   memory storing instructions that, when executed by the at least one processor, cause the system to:
      receive a first video stream and a second video stream;
      send the first video stream through a target egress port of the system;
      receive a switching instruction, wherein the switching instruction is used to instruct the system to switch from the first video stream sent through the target egress port to the second video stream;
      obtain first switching reference information of a first switching packet of the first video stream and second switching reference information of a second switching packet of the second video stream; and
      switch from the first video stream sent through the target egress port to the second video stream based on the first switching reference information of the first switching packet and the second switching reference information of the second switching packet.

20. The system according to claim 19, wherein the system further comprises a controller, and wherein the controller comprises a second processor and a second memory storing instructions that, when executed by the second processor, cause the controller to:
   send the switching instruction.

* * * * *

UNITED STATES PATENT AND TRADEMARK OFFICE
CERTIFICATE OF CORRECTION

PATENT NO. : 11,483,495 B2
APPLICATION NO. : 17/180568
DATED : October 25, 2022
INVENTOR(S) : Zhang et al.

It is certified that error appears in the above-identified patent and that said Letters Patent is hereby corrected as shown below:

In the Claims

Claim 9: Column 34, Line 6: "to perform of operations comprising:" should read -- to perform operations comprising: --.

Signed and Sealed this
Twenty-eighth Day of March, 2023

Katherine Kelly Vidal
Director of the United States Patent and Trademark Office